United States Patent [19]
Ziarno

[11] Patent Number: 6,092,052

[45] Date of Patent: *Jul. 18, 2000

[54] METHOD OF MAXIMIZING STATISTICAL DATA THROUGHPUT AT REMOTELY LOCATED ELECTRONIC DONATION PROCESSING DEVICES, AND ELECTRONIC DEVICE FOR MANAGING STATISTICAL INFORMATION

[76] Inventor: Witold A. Ziarno, 4519 S. St. Louis Ave., Chicago, Ill. 60632

[*] Notice: This patent is subject to a terminal disclaimer.

[21] Appl. No.: 08/533,338

[22] Filed: Sep. 25, 1995

Related U.S. Application Data

[63] Continuation-in-part of application No. 08/194,204, Feb. 8, 1994, abandoned, application No. 08/199,072, Feb. 22, 1994, Pat. No. 5,506,393, application No. 08/318,914, Oct. 5, 1994, application No. 08/503,206, Jul. 17, 1995, Pat. No. 5,696,366, application No. 08/127,770, Sep. 28, 1993, application No. 08/117,909, Sep. 7, 1993, and a continuation-in-part of application No. 08/402,622, Mar. 13, 1995.

[51] Int. Cl.[7] .................................................. G06F 17/60
[52] U.S. Cl. ............................................. 705/21; 705/16
[58] Field of Search ........................... 395/216; 235/379, 235/380, 381, 472; 902/4, 22; 705/1, 16, 17, 21

[56] References Cited

U.S. PATENT DOCUMENTS

| | | | |
|---|---|---|---|
| 4,454,414 | 6/1984 | Benton | 235/379 |
| 4,971,406 | 11/1990 | Hanson | 340/711 |
| 5,036,472 | 7/1991 | Buckley et al. | 364/479 |
| 5,055,660 | 10/1991 | Bertagna et al. | 235/472 |
| 5,243,174 | 9/1993 | Veeneman et al. | 235/381 |
| 5,294,782 | 3/1994 | Kumar | 235/462 |
| 5,358,278 | 10/1994 | Ellis | 281/31 |
| 5,466,919 | 11/1995 | Hovakimian | 235/380 |
| 5,475,585 | 12/1995 | Bush | 395/226 |
| 5,506,393 | 4/1996 | Ziarno | 225/380 |
| 5,546,303 | 8/1996 | Helbling | 705/30 |
| 5,550,561 | 8/1996 | Ziarno | 245/163 |
| 5,555,497 | 9/1996 | Helbling | 395/230 |
| 5,561,604 | 10/1996 | Buckley et al. | 364/479.05 |
| 5,579,489 | 11/1996 | Dornier et al. | 395/281 |

OTHER PUBLICATIONS

"Charitable ATM menu option", ABA Banking Journal, v85, n4, p58, Apr. 1993.

Grantham, Daniel, "Donating to charity now automated", Oakland Press, Jan. 21, 1994.

"Charity throug the ATM . . . " by EFT report v17, n23 p 5(2); Nov. 9, 1994; File 148 C07576063.

*Primary Examiner*—Tod R. Swann
*Assistant Examiner*—Matthew Smithers
*Attorney, Agent, or Firm*—Witold Ziarno

[57] ABSTRACT

The invention provides a method of capturing monetary donations or monetary gifts made by donors or gift givers at points in time and space in which said donors or gift givers are optimally motivated to make said donations or gifts, said donations or gifts being the donation or gift perferences of respective donors or gift givers. The method comprises the steps of inputting a multiplicity of sequences of data comprised of monetary donations or monetary gifts. The monetary donations or monetary gifts are made by a plurality of said respective donors or gift givers consecutively free of input of information unrelated to said respective monetary donations or monetary gifts at a multiplicity of distinct sites where said donations and gifts are being received in one variant. The sequences or strings of data are temporarily captured at the multiplicity of distinct sites on a plurality of respective electronic devices physically located at said sites to obtain temporarily captured sequences. The temporarily captured sequences are then transmitted from the electronic devices to a processing device remote from a plurality of said distinct sites for processing. The method further comprises the optional the step of statistically manipulating at least a respective sequence of said data. In one variant, the present invention provides a donation kettle for accepting information from an information bearing card. The electronic terminal includes means for tallying the amount of card donations accepted, and collecting, analyzing, and displaying information regarding the donation.

28 Claims, 14 Drawing Sheets

$$C(p) \propto I_i \quad \text{4062} \quad C(p) = (I_i)(k_1)$$

$$C(p) \propto M_i \quad \text{4064} \quad C(p) = (M_i)(k_2)$$

$$C(p) \propto P_i \quad \text{4066} \quad C(p) = (P_i)(k_3)$$

$$C(p) \propto G_i \quad \text{4068} \quad C(p) = (G_i)(k_4)$$

$$C(p) \propto C_i \quad \text{4070} \quad C(p) = (C_i)(k_5)$$

$$C(p) \propto N_i \quad \text{4072} \quad C(p) = (N_i)(k_6)$$

$$C(p) \propto X_i \quad \text{4074} \quad C(p) = (X_i)(k_7)$$

$$C(p) \propto A_i \quad \text{4076} \quad C(p) = (A_i)(k_8)$$

FIG. 13

METHOD OF MAXIMIZING STATISTICAL DATA THROUGHPUT AT REMOTELY LOCATED ELECTRONIC DONATION PROCESSING DEVICES, AND ELECTRONIC DEVICE FOR MANAGING STATISTICAL INFORMATION

CROSS-REFERENCE TO RELATED APPLICATIONS

Claiming Benefit Under 35 U.S.C. 120

This application is a continuation-in-part application of U.S. application, Ser. No. 08/194,204, filed Feb. 8, 1994, now abandoned and U.S. application, Ser. No. 08/199,072, filed Feb. 22, 1994 now U.S. Pat. No. 5,506,393, U.S. application, Ser. No. 08/318,914 filed Oct. 5, 1994, and U.S. application, Ser. No. 08/503,206 filed Jul. 17, 1995 now U.S. Pat. No. 5,696,366. This application is also a continuation in part patent application of U.S. patent application Ser. No. 08/127,770, filed Sep. 28, 1993, and a continuation in part of U.S. patent application Ser. No. 08/117,909, filed Sep. 7, 1993, and a continuation in part application of U.S. patent application Ser. No. 08/402,622, filed Mar. 13, 1995.

BACKGROUND OF THE INVENTION

This invention relates to an electronic kettle that records, and manages statistical information about a multiplicity of contributors and donation kettle system for easily gathering statistical information for a charitable organization from a plurality of remote locations, and the like.

Donation kettles are commonly located at or near shopping centers, stores, and the like. Generally, the presence of donation kettles increases near a holiday season. Donation kettles are generally attached to stands. Stands are made of steel, iron, bronze, and other metals and used to support a donation kettle at a height that accommodates the making of a cash or coin donation. Stands frequently have a sign located on the top of the stand to indicate the charitable organization is requesting a donation.

A contributor visits a donation kettle commonly to make a donation to a charitable organization. A contributor drops a donation into the donation kettle. A donation is most often in the form of cash or coin.

A primary problem exists with respect to tha ability to secure and immediately record statistical information about a plurality of successive contributors. Consequently, there exists a need for a method, electronic terminal, and method of immediately recording statistical information concerning a plurality of successive contributors, including, by way of example, the identity of successive contributors, average contribution amounts made by a pluralityof successive contributors, and real time tallies of contributions.

Moreover, another shortcoming of making a donation at a donation kettle or a plurality of donation kettles is that there is no integration of information associated with a plurality of individual donations. Consequently, there exists a need for a donation kettle network that integrates a plurality of individual donations made at a donation kettle at varying times and/or remote locations.

It is, therefore, an object of the present invention to provide an electronic kettle which allows a plurality of successive contributors to enter information about themelves thereon, immediately records the information, automatically tallies the statistical information and/or associates information from an information bearing card of the successive contributors to databases of charitable organizations including identities of contributors, and contribution amounts.

It is yet another object of the present invention to provide a donation kettle network that can collect, integrate, and display information associated with successive individual donations and provide useful quantitative data.

SUMMARY OF THE INVENTION

These and other objects of the present invention are achieved in an electronic donation device accepting information from an information bearing card of successive contributes.

The invention provides a method of capturing monetary donations or monetary gifts made by donors or gift givers at points in time and space in which said donors or gift givers are optimally motivated to make said donations or gifts, said donations or gifts being the donation or gift perferences of respective donors or gift givers. The method comprises the steps of inputting a multiplicity of sequences of data comprised of monetary donations or monetary gifts. The monetary donations or monetary gifts are made by a plurality of said respective donors or gift givers consecutively free of input of information unrelated to said respective monetary donations or monetary gifts at a multiplicity of distinct sites where said donations and gifts are being received in one variant. The sequences or strings of data are temporarily captured at the multiplicity of distinct sites on a plurality of respective electronic devices physically located at said sites to obtain temporarily captured sequences. The temporarily captured sequences are then transmitted from the electronic devices to a processing device remote from a plurality of said distinct sites for processing. The method further comprises the optional step of statistically manipulating at least a respective sequence of said data.

In one variant, the present invention provides a donation kettle for accepting information from an information bearing card. The electronic terminal includes means for tallying the amount of card donations accepted, and collecting, analyzing, and displaying information regarding the donation.

In another varinat, the present invention also provides a donation kettle that provides a docking station for an integrated card donation processor and/or a portable card processor.

The present invention further yet provides a method for processing a donation obtained via a donation kettle by a card account processor.

The present invention provides a donation kettle network including a plurality of donation kettles. These and other objects will become apparent in the course of a detailed description of the invention.

BRIEF DESCRIPTION OF THE DRAWINGS

FIG. 13 illustrates relationships between the contribution potential of contributors or gift givers and other related variables.

DETAILED DESCRIPTION OF THE INVENTION

Figure 1:
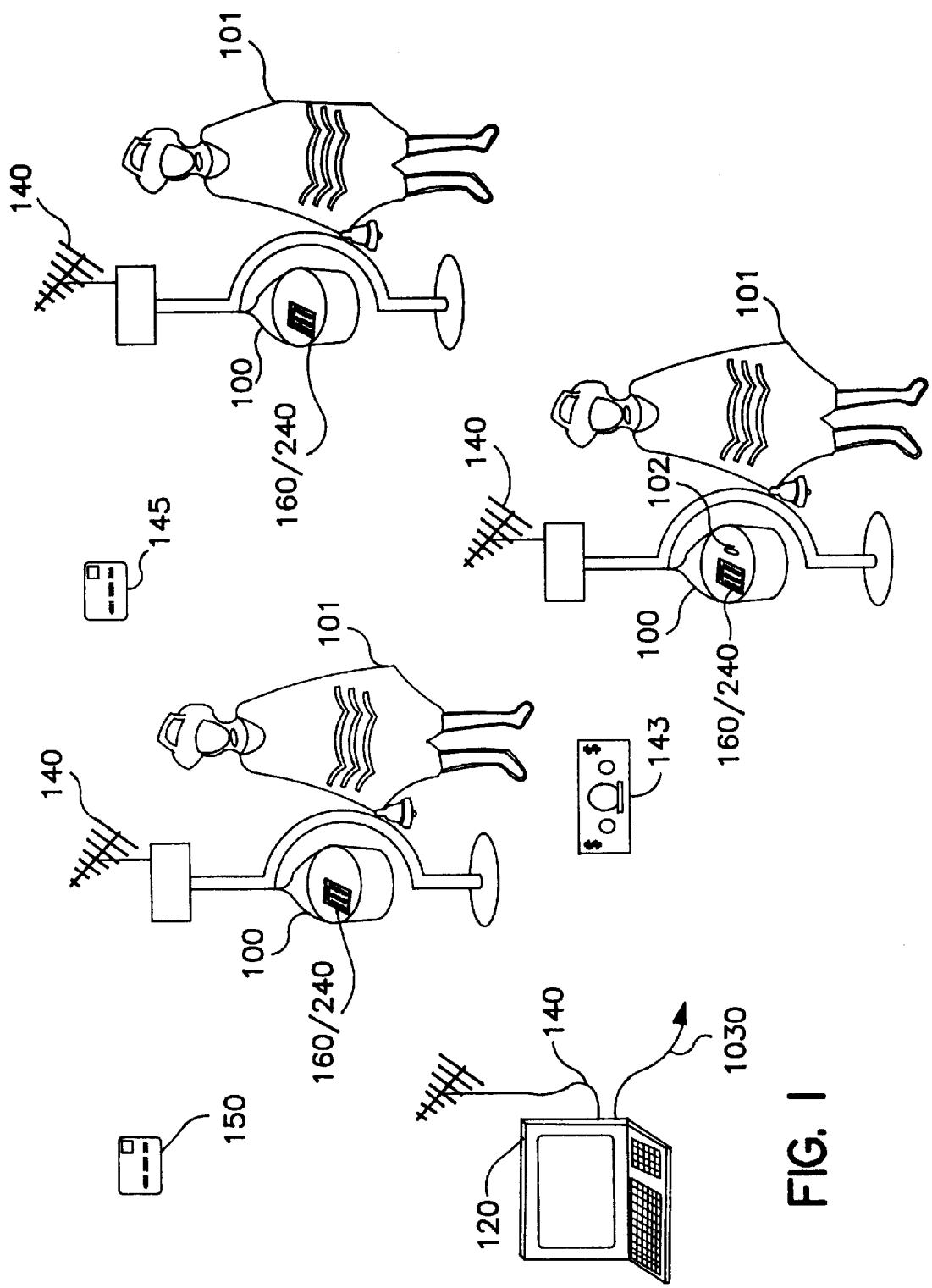
FIG. 1 is an overall system configuration of a donation kettle network according to the present invention.

FIG. 1 is an overall configuration of a donation kettle network according to the present invention.

In one embodiment, an electronic device is a donation kettle 100 that gathers a cash donation 143. In a second embodiment, an electronic device is a donation kettle 100 that gathers a credit card donation 145. In a third embodiment, an electronic device is a donation kettle 100 gathers a debit card 150 donation. The term "card" when used without the descriptors "credit" or "debit" refers to both a credit card and a debit card and includes IC Cards ("smart cards"), magnetically striped cards, and other forms of information bearing cards. The term "card" also contemplates a private label card issued or maintained by a charitable organization or an affiliate of a charitable organization, and a prepaid card that can be purchased by cash, check, credit, or debit card. Further, the use of the term donation kettle is only illustrative as used herein and should not detract from the scope of the invention in that other electronic, magnetic, and optical devices can be used herewith in the same manner as donation kettle 100 to enable the method described herein.

By way of example, a donation kettle 100 collects and provides information about a contributor and a donation. Using a communication link 140, preferably an RF (radio frequency) communication link, an infra-red or other free-propagating electromagnetic energy communication link, a donation kettle 100 communicates the information about a contributor to terminal 120 in one embodiment.

In an alternate embodiment, the donation kettle 100 first stores the information about the contributor and/or the donation it has accepted in a data storage 302 (FIG. 1a), and then at a latter time communicates it to terminal 120 via communication circuitry 990 (FIG. 1a) and a communication link 140, e.g. after a single session of donation collection. Terminal 120 might be located on-site at a charitable organization or at some remote location, by way of example, at an accountant's office. Terminal 120 then communicates the information about the contributor and/or the donation via a communication link 1030, which by way of example, might include a telephone hookup, with a card account processor database 1032 (FIG. 2b), or the like.

In yet another embodiment, donation kettle 100 communicates information about the contributor, and/or the donation directly via communication link 1030, by way of example, a telephone hookup, thereby bypassing terminal 120 to a card account processor 1032 (FIG. 2b), and the like. The card account of the contributor is appropriately charged the amount of the donation, or debited for the donation, as appropriate, and the account of the charitable organization is augmented respectively.

In yet a further embodiment, a first donation kettle 100 communicates contributor information, status information, and/or donation information to a second donation kettle 100 via communication circuitry 990 (FIG. 1a) and a communication link 140. In yet another embodiment, a plurality of donation kettles 100 communicate contributor card information and/or donation amount information to terminal 120 via communication link 140. Terminal 120 communicates contributor card information and/or donation information to a card account processor database 1032 (via link 1030) (FIG. 2b). In yet an alternate embodiment, a plurality of donation kettles 100 communicates contributor card information and donation information to a modem for transmission to a card account processor database.

By way of further example, a donation kettle 100 contains a credit card donation processor 160, and/or a debit card donation processor 240. Such a processor directly utilizes a cellular communication link, or other standard telephone hookup. The present invention further contemplates that reader 307 (FIG. 1a) can read IC cards, PCMCIA cards, and/or coded cards. Donation kettle 100 stores a contributor's card account and donation information in data storage 302 (FIG. 1a). After a donation session, communication link 1030 is connected directly to the processor 160/240, and communication circuitry 990 via communication link 1030 transfers the contributor and donation information to a card account processor database, and the like. The card account of the contributor of the charitable organization is appropriately charged or debited the amount of the donation and the account of the charitable organization is augmented respectively.

It will further be appreciated that theft of a donation kettle 100 that contains a card processor 160/240 may be less likely since there is no cash to be stolen but rather electronic card information which will be difficult, if not impossible, for a thief to utilize.

The present invention also provides a method of processing a donation obtained via donation kettle 100 by a card account processor. A card donation processor 160/240 obtains card account information and/or information representative of a donation amount from a contributor. The card account processor receives card account information and/or the donation amount information via a direct communication link, by way of example, link 140, and/or an indirect link, e.g. link 140 and link 1030 via terminal 120. In one embodiment, terminal 120 contains a modem and related circuitry. The card account processor enters a debit representative of the donation amount to an account of an contributor, and enters a credit representative of said donation amount to an account of a charitable organization. Card account and/or donation information is submitted in batch to a card account processor in one embodiment. Similarly, card account and/or donation information collected via a worship terminal, worship terminal network, offering plate, and/or offering plate network can be transmitted in batch to a card account processor.

The present invention includes a set of software routines which run on donation kettle 100 to tally a plurality of donations. In an alternate embodiment, a set of software routines run on terminal 120. A software routine tallies a credit card 145 donation, a debit card 150 donation, a cash donation 143, and combinations thereof, for a single contributor or a plurality of contributors. Moreover, a software routine performs a number of arithmetic functions including but not limited to, by way of example, addition, subtraction, multiplication, division, as well as statistical calculations. A software routine is linked to commercially available accounting programs in one embodiment.

In an embodiment, a plurality of successive contribution data, comprising card information from an information bearing card and associated numerical contribution amount information, are grouped together. The grouped information is then transmitted to a card account processor. The card account processor authorizes a sub-group of contribution data for further processing. The authorized and unauthorized contribution data can be transmitted to a donation kettle electronic contributions management terminal 100, fund-raiser's terminal 120, a donation kettle electronic contributions management organization database, or combination thereof, for exclusion of the unauthorized contribution data. The unauthorized contribution data can be deleted if desired at a card account processor. The unauthorized contribution data are excluded from the group, and the authorized contribution data, e.g. card information and contribution amount information, are re-transmitted to the card account processor. Means responsive to information sent via a transferring means enters a debit representative of the contribution amount information to an account of the contributor. Means responsive to information sent via the transferring means enters a credit representative of the contribution amount information to an account of a donation kettle electronic contributions management organization. The contribution data is further processed and a record of the contribution for substantiating a contribution is forwarded to a contributor or fund-raiser.

In conjunction with a printer, a donation kettle 100 may be used to generate a report commonly used for accounting, including but not limited to a summary of total donations generated, a monthly statement, a histogram, a donation average per contributor, sub-group of contributors, or group of contributors.

In conjunction with a printer, fund-raising terminal 100, fund-raiser's terminal 120, or combination thereof, can be used to generate a report commonly used for accounting purposes, including but not limited to a summary of total contributions and gifts generated, a monthly statement, a histogram, a contribution average per contributor, sub-group of contributors, or group of contributors.

The donation kettle electronic contributions management terminal terminal network of the present invention, which includes a hand-held donation kettle electronic contributions management terminal terminal 100, a fund-raiser's terminal 120, a card account processor 1031, or combination thereof, collects, analyzes, and visually displays statistical information associated with an individual contribution or a tally of individual contributions and gifts. The donation kettle electronic contributions management terminal terminal 100 contains an optional statistical information collecting routine S500, a set of software routines which run on processing circuitry 903 (FIG. 1$a$). In a variant, the statistical information collecting routine S500 is located in the fund-raiser's terminal 120. The statistical information collecting routine S500 collects contribution data from the contribution reader 1340 and associated circuitry 1333 (FIG. 1$a$), and communicates it to storage 302 (FIG. 1$a$). A statistical information analyzing routine S520, a set of software routines which run on a donation kettle electronic contributions management terminal terminal 100 located within the donation kettle electronic contributions management terminal terminal 100 in one embodiment, or in the fund-raiser's terminal 120 in an alternate embodiment, then retrieves contribution data from data storage 302 and performs arithmetic and statistical calculations thereon.

In yet a further embodiment, a donation kettle 100 contains a statistical software routine which runs on processing circuitry 903 (FIG. 1$a$). In an alternate embodiment, the statistical software routines run on the terminal 120. The statistical software routine collects donation data from the card reader 307 and associated circuitry 303 (FIG. 1$a$), and communicates it to storage 302 in one embodiment. A statistical software routine retrieves donation data, contributor data, petition data, intention data, usage data, and/or data concerning the status of a donation kettle 100, from data storage 302 and performs arithmetic and statistical calculations thereon.

There are various types of statistical information that can be associated with a donation, a contributor, or usage of a donation kettle 100, and analyzed by a statistical software routine. By way of example, one measure of the frequency of use of donation kettle 100 is the amount and/or number of donations generated at the donation kettle 100 and/or the time, date, and number of contributor's utilizing the donation kettle 100. Donation kettle 100, in one embodiment, or terminal 120, in another embodiment, generates a report measuring the frequency of use of a particular donation kettle 100 or group of donation kettles 100, the donation habits of a contributor or a group of contributors, and the number of contributors as measured by the number of donations given, via the above described statistical software routine, and associated hardware. The routine might also include an interface with a commercially available computer program, a customized accounting computer program, and/or a statistics computer program.

FIG. 1$a$ is a general schematic block diagram of one embodiment of a donation kettle 100 of the present invention which includes a card reader 307 and associated circuitry 303, power source 1437, and communication circuitry 990. Although display circuitry 842 and display 840 is shown in this general embodiment of the invention, display 840 and/or display circuitry 842 need not be included in specific embodiments of the invention.

In the present embodiment, processing circuitry 903 includes a microprocessor. However, multiple microprocessors, or a plurality of dedicated microprocessors may also be used. Processing circuitry 903 and associated circuitry are powered through power source 1437. Processing circuitry 903 interfaces with associated circuitry via an address bus 536, data bus 533, and control bus 530. Specifically, upon detection by the card reader 307 that a donation is being made, card reader circuitry 303 interrupts processing circuitry 903. Circuitry 903 responds to the interrupt by reading the buffered donation information. Circuitry 903 then stores the donation information in storage 302. In one embodiment, circuitry 903 also adds the new donation information to a running total of donation information stored in storage 302.

A variety of links and associated circuitry are used in the present invention. By way of example, link 140 is a serial link and associated circuitry in one embodiment, an RS-232 link and associated circuitry in another embodiment, modem circuitry in communication with circuitry 990 in yet another embodiment, or an RF or infra-red link and associated circuitry in another embodiment.

A variety of additions can be added to the embodiment of processing circuitry 903 illustrated in FIG. 1*a*. By way of example, a keyboard and associated circuitry, a touch sensitive screen and associated circuitry, an optical character recognition reader and associated circuitry, an electronic signature line and associated circuitry, a card reader and associated circuitry, a coin reader and associated circuitry, a bill dispenser and associated circuitry, a display and associated circuitry, a coin dispenser and associated circuitry, a sound board and associated circuitry, a speaker and associated circuitry, a docking station for a card reader and associated circuitry, a debit card processor, a currency validator, a currency discriminator, a currency acceptor, a coin discriminator, a coin validator, or a combination thereof, can be added.

Terminal 120 drives a printer in one embodiment to produce a hard copy of a report representing data sent to terminal 120 via communication circuitry 990. Processing circuitry 903 communicates contributor, usage, status, and/or donation information to communication circuitry 990 which drives a printer to print out data via a wired link, for example, an RS-232 cable. Similarly, donation kettle 100 can use a serial link to drive a printer directly via communication circuitry 990.

Display circuitry 842 includes a buffer and LED drive circuitry which processing circuitry 903 can write information into in one embodiment. Display circuitry 842 responds to data written into the buffer by displaying that information via control bus 530. A donation kettle 100 of the present invention may include a single or multiple displays, e.g. (FIG. 2).

Moreover, power source 1437 is a battery power source in one embodiment. Preferably, the battery is a rechargeable source, and is located on the donation kettle 100 so as to be easily accessible during replacement or recharging thereof. In another embodiment, power source 1437 includes a hardwired power supply. In yet another embodiment power source 1437 is located in stand 153 (FIG. 2). In yet a further embodiment power source 1437 is located in portable card processor 160/240, e.g. FIG. 3.

Moreover, power source 1437 is a battery power source in one embodiment, and can be a portable rechargeable power source in another embodiment. Preferably, the battery is a rechargeable power source, and is located on the donation kettle electronic contributions management terminal 100 so as to be easily accessible during replacement or recharging thereof. The power source 1437 can include a hardwired power supply. The present invention also contemplates use of a light responsive energy source such as a photo-cell. In such an embodiment, not shown, the battery life of terminal 100 can be enhanced in that energy is obtained from sources of light such as the sun or indoor lighting. The light responsive energy source can be used to supplement the power source 1437. In a variant, software routines on terminal 100 assist in conserving electrical energy from power source 1437 by deactivating the circuitry or portions thereof, e.g. the display, of terminal 100. Circuitry of terminal 100 is reactivated once there is card information detected by reader 307 and associated circuitry, or combination thereof. In yet a further variant, a back-up power source is provided to power source 1437. In yet a further variant, contribution transaction data is semi-permanently stored for future off-loading in data storage 302 in the event there is a loss of power from power source 1437.

Figure 2:
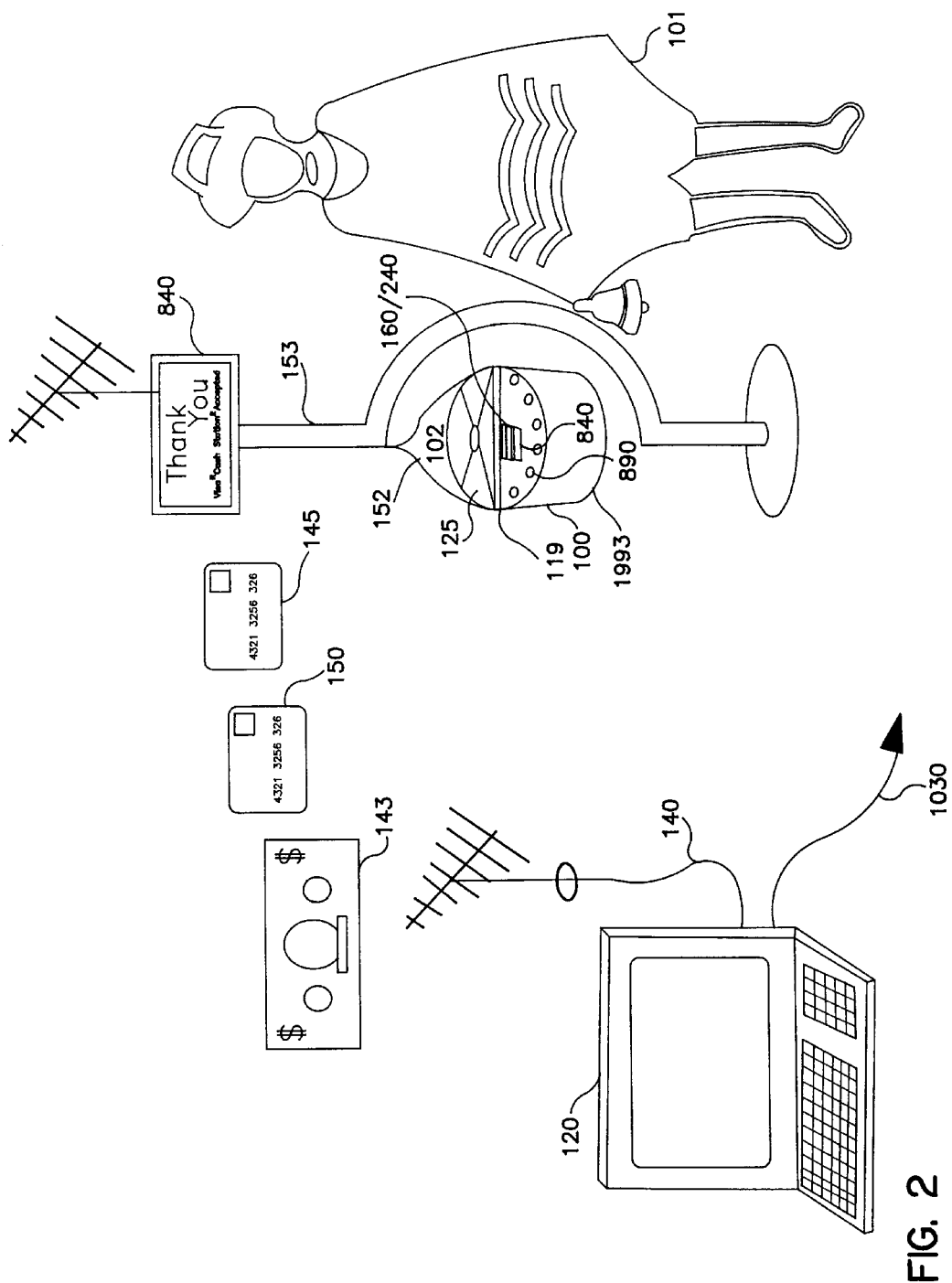
FIG. 2 is a perspective view of an embodiment of an exemplary donation kettle with a card donation processor, a keyboard, a speaker, a display, a terminal, a cash donation, a credit card donation, a debit card donation, and an attendant.

FIG. 2 is a perspective view of a donation kettle 100 with a card donation processor 160/240, a keyboard 890, a display 840, a speaker 1993, a hinge 119, a surface 125, a slot 102, a handle 152, a stand 153, an attendant 101, terminal 120, a cash donation 143, a credit card donation 145, and a debit card donation 150. In one embodiment, a donation kettle 100 may have only one of the above additions. In an alternate embodiment, a donation kettle 100 has a combination of the above additions.

A contributor feeds a coin donation (not pictured) or cash donation 143 into slot 102 which forms part of surface 125 in one embodiment. Slot 102 is an opening formed in the side or top of donation kettle 100 which provides a channel to a center retaining area 200 (FIG. 5) of donation kettle 100.

One embodiment of donation kettle 100 contains a credit card donation processor 160 and a debit card donation processor 240, e.g. processor 160/240. The present invention contemplates that donation kettle 100 might only contain a credit card donation processor 160. Alternatively, the present invention also contemplates that donation kettle 100 might only contain a debit card donation processor 240. In yet a further embodiment, the present invention contemplates that both a credit card donation processor 160 and a debit card donation processor 240 might be located on donation kettle 100 at different physical locations.

Card processor 160/240 includes a card slot defining member which defines a card slot in one embodiment. A contributor swipes or inserts a credit card 145 into or through card slot of a credit card donation processor 160. Alternatively, a contributor swipes or inserts a debit card 150 through a card slot of a debit card donation processor 240. Moreover, as used herein, the term "card donation processor" when used without the descriptors "credit" or "debit" refers to either a credit card processor, debit card processor, or both a credit and debit card processor. The term "processor" also refers to a card terminal.

By way of further example, in an embodiment, donation kettle 100 contains a card processor 160/240 that reads smart cards, e.g. PCMCIA cards, JEIDA/PCMCIA compliant memory cards, IC cards, GEC Card Technology Ltd. IC cards, West Midlands, U.K., and/or Gemplus Card Services memory and microprocessor cards. The present invention also contemplates that use of contactless IC cards, e.g. such as those available from Mitsubishi Electric UK Ltd, Hatfield UK, and Oakwood Design, Letchworth UK, and the like.

In a preferred embodiment, donation kettle 100 has both a credit card donation processor 160 and a debit card donation processor 240 utilizing a single processor that discriminates between the type of donation made. An exemplary credit and debit card processor 160/240 is disclosed in U.S. Pat. No. 5,012,077 which is incorporated herein by reference as if fully set forth.

In one embodiment, the card donation processor 160/240 communicates with key pad 890. By way of example, upon receiving the communication that a card donation is to be given, key pad 890 reveals a key associated with a cash denomination. By way of example, the key associated with a cash denomination might appear to disclose a one, five, ten or twenty dollar symbol as described below. The contributor presses the key associated with a cash denomination that is the preferred amount of his donation. By way of further example, key pad 890 is a programmable key pad in one embodiment. In another embodiment, key pad 890 is a touch sensitive screen. In yet a further embodiment, a symbol representative of a donation amount is affixed to a key pad 890, e.g. $1.

It will be appreciated that most credit card 145 donation amounts will not require an authorization by signature or numeric code. Consequently, in one embodiment, the present invention contemplates that a contributor will simply need to swipe or insert card 145/150 through card processor 160/240 and enter the amount of his donation by pressing a key associated with a cash denomination on key pad 890. In an alternate embodiment, key pad 890 is a standard key pad.

A contribution can be made on an off-line donation kettle electronic contributions management terminal terminal 100. The donation kettle electronic contributions management terminal terminal 100 does not interpose a request, or requests, for an authorization or verification, an authorization step, pre-authorization step, verification step, or combination thereof, between the making or entering of a contribution transaction made by a first contributor, and subsequent contribution transactions made by a plurality of subsequent contributors. In another embodiment of the method disclosed herein, the donation kettle electronic contributions management terminal does not interpose a request for an authorization or verification, an authorization step, pre-authorization step, verification step, or combination thereof, between the making of a sub-group of contribution transactions within a group of contribution transactions (N) made by contributor$_1$ through contributor$_{N-1}$, e.g. at a single donation kettle electronic contributions management location or session at a remote location. By way of example, there may be several hundred cardholder contribution transactions, e.g. N=500. Sequential contribution transactions are made by contributor 1 to contributor 500 prior to interposing a request for an authorization or verification, an authorization step, pre-authorization step, verification step, or combination thereof at terminal/peripheral 100. In another variant, sequential contribution transactions are made by contributor 1 to contributor 500 prior to interposing a request for an authorization or verification, an authorization step, pre-authorization step, verification step, or combination thereof, between contribution transaction 10 and contribution transaction 11, contribution transaction$_n$ (where n is an integer greater than 10) and contribution transaction$_{n+1}$, or combination thereof. Donation kettle electronic contributions management terminal 100, fund-raiser's terminal 120, a card account processor 1031 (including a clearing organization and/or an issuing organization), donation kettle electronic contributions management terminal network, or combination thereof, post contribution processes card information and contribution amount information. Post contribution processing may include a request for authorization or verification, an authorization step, pre-authorization step, verification step, or combination thereof. It will be understood that a plurality of sequential contributions and gifts made by a first contributor, a second contributor, and . . . nth contributor can be made at a terminal 100 off-line before the information representative of the contributions and gifts, e.g. card information and numerical contribution amount information, is off-loaded from an off-line terminal 100 to card account processor 1031, fund-raiser's terminal 120, or combination thereof, for processing and authorization. It is further understood that the speed with which a multiplicity of sequential contributions and gifts can be accepted from a large group of sequential contributors is greatly accelerated since a request for authorization or verification, an authorization, pre-authorization, verification step, or combination thereof, is not interposed between an entry of card information and entry of a numerical monetary contribution amount by each respective contributor. It is yet further understood that this method and apparatus allows down stream contributors to be closer in time and place to the stimulus, or impulse created by the stimulus, to make a contribution transaction.

By way of example, there may be several thousand cardholder contributors at a remote location, e.g. outside a shopping center or retailer during the holiday season. Donation kettle electronic contributions management management terminal 100$_1$ through donation kettle electronic contributions management management terminal 100$_X$ (where X is an integer) are circulated among the prospective card-holding contributors; Contributions are made by each respective cardholding contributor desiring to do so. Each respective donation kettle electronic contributions management management terminal 100 can receive several hundred contribution transactions. Tens of hundreds of contribution transactions are received at one donation kettle electronic contributions management event by donation kettle electronic contributions management management terminals 100$_{1-X}$. These tens of hundreds of transactions are then off-loaded at the end of such an event from the donation kettle electronic contributions management management terminals 100$_1$ to donation kettle electronic contributions management management terminal 100$_X$ for further processing as described above. It will be seen that literally tens of hundreds of contributions can be received from cardholder contributors in a single donation kettle electronic contributions management event. The apparatus and method of the invention are highly efficient in receiving possibly tens of thousands of dollars of contributions and gifts within a single event, the event lasting a matter of hours. It is further understood that the impulse to make a contribution transaction for the group of card holding contributors at the single event is captured in time and space, and that a contributors' contribution preference can be made on terminal 100.

The request for authorization or verification, authorization step, verification step, or combination thereof, is decoupled from each respective contribution transaction at the time the entry of a respective contributor's respective card information and contribution amount information is entered into a terminal 100.

It will be further understood that a plurality of contributions and gifts can be accepted in a short amount of time utilizing this procedure and that contributions and gifts that are later found to be unauthorized can be discarded and only authorized contributions and gifts are then credited to a fund raiser's account 1033 and debited to a contributor's account 1035. It is also possible to store the group of unauthorized transactions so that the contributors making these contribution transactions can be contacted to resubmit their respective contributions and gifts.

The card processor 160/240 communicates with key pad 890 on the face of a hand-held terminal 100. Upon receiving the communication that a card contribution is to be given, the key pad 890 reveals a key associated with a cash denomination. By way of example, the key associated with a cash denomination can appear to disclose a one, five, ten or twenty dollar symbol as described below. The contributor presses the key associated with a cash denomination that is the preferred amount of his contribution, and presses entry key 920.

In a variant, a cardholder contributor passes his information bearing card 145/150 through card reader 307. Information regarding the type of card read is detected, e.g. a determination is made whether a premium card has been read such as a "GOLD CARD" versus some other type of card ("A CLASSIC CARD or VISA BUSINESS CARD"), or whether other indicia regarding a contributor's credit worthiness, credit limits, or affluence are present. It will be appreciated that cardholders with high credit limits or bearing a premium card such as a gold card can be more affluent individuals tending to contribute larger contribution amounts. If a premium card is detected or if other information indicative of the cardholder's credit worthiness or affluence is detected, recommended contribution amounts appear on key pad 890. These recommended contribution amounts can be larger recommended contribution amounts. By way of example, when contributor$_A$ passes his information bearing credit card that is a VISA® GOLD Card through card reader 307. The information indicative of the type of card that contributor$_A$'s card is, is processed via software routines and a single or a plurality of recommended contribution amount keys appear on terminal 100's touch screen interface, e.g. $100, $150, $500. In a variant, when contributor$_B$ passes his information bearing credit card that is a VISA® CLASSIC Card through card reader 307. The information indicative of the type of card that contributor$_B$'s card is processed via software routines and a single or a plurality of recommended contribution amount keys appear on terminal 100's touch screen interface, e.g. $10, $15, $20. It will be seen that the cumulative amount of a group of respective contribution transactions that are received from a group of cardholder contributors in a single donation kettle electronic contributions management event will be maximized utilizing this apparatus and method.

Most credit card 145 contribution amounts will not require an authorization by signature or numeric code. Consequently, the present invention contemplates that a contributor will simply need to swipe or insert an information bearing card 145/150 through, or into, the terminal 100, as required, and enter the amount of his contribution by pressing a key associated with a cash denomination in making his contribution on the key pad 890. The first contributor passes terminal 100 to a subsequent contributor who repeats the contribution step by depressing a key as to the amount given by him. The same steps are optionally performed by a plurality of contributors each choosing his or her monetary amount to be given. The card information and contribution information is then post processed. Post processing includes transmitting the card information and contribution information to a card account processor to request a verification or authorization, for crediting and debiting of the appropriate accounts, or combination thereof. The present invention contemplates that a contributor will have pre-authorized the donation kettle electronic contributions management organization to collect a contribution amount. Pre-authorization can include an agreement with the organization that a contributor authorizes the contribution of a given amount once a certain action takes place, i.e. the contributor swipes card 145/150 through donation kettle electronic contributions management terminal 100. The pre-authorized contribution amount and the contributor's card information are correlated, and forwarded to a card account processor for post-processing.

By way of further example, a contributor 1 (FIG. 13) enters into an arrangement with a donation or gift recipient organization. The arrangement is that donation kettle electronic contributions management organization will associate preferred contribution amount data with the contributor's card information data each time the contributor enters his respective card information data onto a respective terminal 100. It will be appreciated that this method allows for contributor 1 to simply enter his card information in the terminal to make a contribution. Less time is spent by the contributor 1 focusing on the financial aspects of the transaction.

In the case of a debit card 150 contribution via a donation kettle electronic contributions management terminal 100, the contributor can authorize the donation kettle electronic contributions management organization to use a secret identification number associated with his debit card account in order to allow the organization to automatically obtain the contribution without seeking subsequent authorization from the contributor. Alternatively, the contributor may enter his personal identification number (PIN) into terminal 100, terminal 120, or combination thereof, and terminal 100, 120, or combination thereof, stores the PIN in an encrypted form for later processing. In this scenario, the contributor need only perform the action of swiping or inserting, as required, card 150 through processor 160/240 on donation kettle electronic contributions management terminal 100 to make a contribution. The secret identification number is associated or correlated with the card information, contribution amount information, or combination thereof, and forwarded to a card account processor for post processing. In this scenario post processing includes obtaining appropriate authorizations, and crediting and debiting the contributor's account and the donation kettle electronic contributions management organizations account, or combination thereof, as required.

The present invention also makes provision that a contributor need not to disclose a contributor's card 145/150 account authorization code to the donation kettle electronic contributions management organization for security reasons but still may wish to make a card 145/150 contribution. In this case, the present invention contemplates that the donation kettle electronic contributions management terminal 120, donation kettle electronic contributions management terminal 100, or combination thereof, has an input 307 that allows for entry of the contributor's card 145/150 account authorization code so that it is encrypted and only decipherable and usable by the donation kettle electronic contributions management terminal 120, donation kettle electronic contributions management terminal 100, a card account processor, or combination thereof, for processing the card 145/150 contribution. An advantage of this feature is added security for the contributor. The present invention also contemplates using a touch sensitive screen, not shown, to input, a contributor's name, credit card and/or debit account information, the collection for which the contribution is made if there are multiple collections, and the like.

A single or a plurality of associated card 145,150 contributions and gifts is stored in data storage 302. A set of software routines associates or correlates a contributor's card account information with a contribution amount. The contributor has made a number of card contributions and gifts within a specified time period which are stored and tallied by a set of software routines. Optional small contribution service routine downloads a plurality of a contributor's card contributions and gifts once a card contribution amount threshold is reached.

The donation kettle electronic contributions management terminal 100 can adopt pen-based input or touch sensitive screen input. A pen and screen provide a contributor a substitute for key pad 890. By way of example, a contributor may use a pen to write in the amount of contribution or other alpha-numeric text on a screen, not shown. Alternatively, a symbolic key associated with a cash denomination might appear on a screen. The contributor then uses a finger to touch the symbolic key associated with a cash denomination and designates the contribution amount. If a contributor's signature is required, a pen can also be used with a screen as an electronic signature line. The contributor's signature entered on a screen can be collected, stored, and/or transmitted by card processor 160/240 along with contribution information to a third party card processor via a communication link 1030. Alternatively, this information might be sent to donation kettle electronic contributions management terminal 120 via a communication link 140 for further processing, storage, and/or transmittal via communication link 1030.

In an alternate embodiment, the present invention contemplates that a contributor will have pre-authorized the charitable organization to collect a donation amount. Pre-authorization might include an agreement with the organization that a contributor authorizes the donation of a given amount once a certain action takes place, i.e. the contributor swipes or inserts card 145/150 into or through card processor 160/240 at a donation kettle 100.

In the case of a debit card 150 donation via a donation kettle 100, the contributor might authorize the charitable organization to use a secret identification number associated with his debit card account in order to allow the organization to automatically obtain the donation without seeking subsequent authorization from the contributor. In this scenario, the contributor need only perform the action of swiping or inserting card 150 through processor 160/240 on donation kettle 100 to make a donation.

The present invention also contemplates that a contributor might wish not to disclose a contributor's card 145/150 account authorization code to the charitable organization for security reasons but still might wish to make a card 145/150 donation. In this case, the present invention contemplates that the donation kettle 100 has an input that allows for entry of the contributor's card 145/150 account authorization code. An advantage of this feature is added security for the contributor.

The present invention also contemplates the addition of sound board circuitry (not pictured), and speaker 1993 (See, e.g. the additions described in FIG. 1a). By way of example, a sound board, such as a Sound Blaster® board may be commercially obtained from Creative Labs located in California. After a contributor makes a donation a message is conveyed via sound board circuitry and speaker 1993. The sound of a bell, and also other messages, may also be conveyed via sound board circuitry and speaker 1993 to attract contributors. In an alternate embodiment, a donation kettle 100 and its related circuitry incorporates a CD Rom player as an addition.

Figure 2A:
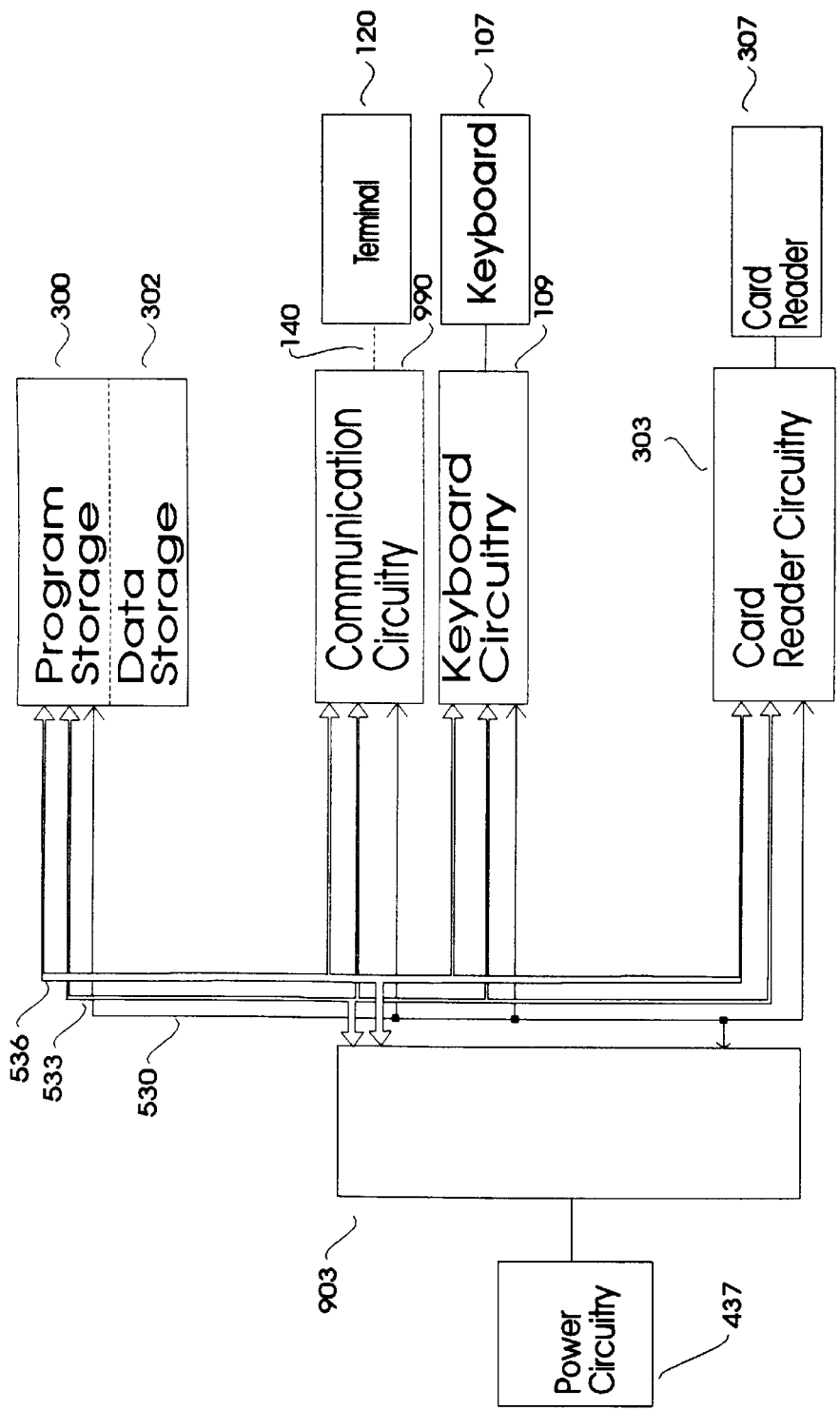
FIG. 2a is a schematic block diagram of an embodiment of a donation kettle with a card reader and associated circuitry, communication circuitry, a keyboard and associated circuitry.
Figure 2B:
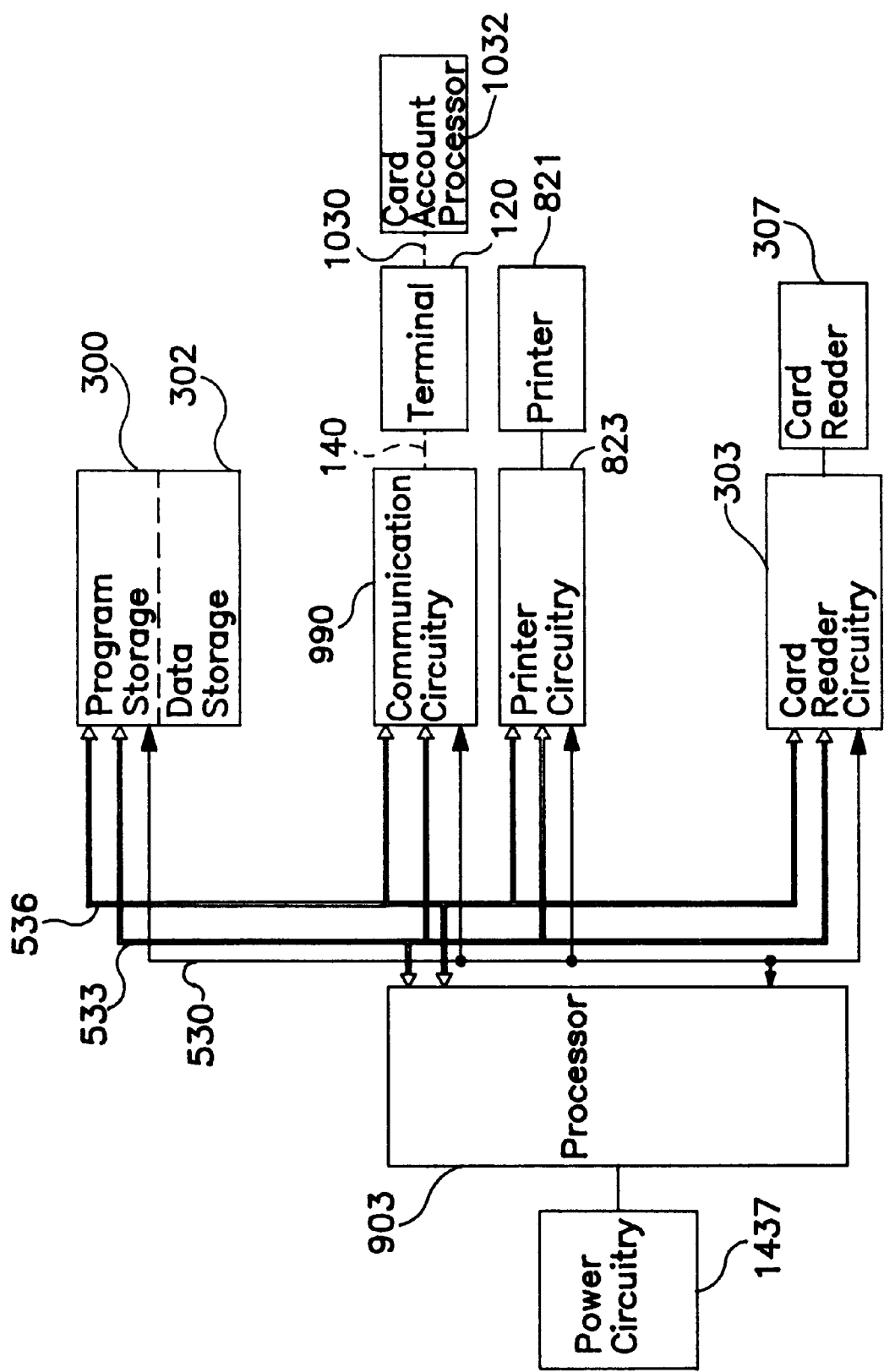
FIG. 2b is a schematic block diagram of one embodiment of a donation kettle with a card reader and associated circuitry, communication circuitry, a receipt generator (a printer and associated circuitry), a terminal, and a card account processor database.

FIG. 2a is a schematic block diagram of one embodiment of a donation kettle 100 with a card reader 307 and associated circuitry 303, communication circuitry 990, a keyboard 107 and associated circuitry 109. This embodiment has the features described generally in FIG. 1a above as well as other features that will be described below.

Generally in all embodiments where a keyboard is present, keyboard circuitry 109 scans keyboard 107 to determine if a key has been hit. Keyboard 107 refers to keypad 890 and/or an entry key (not pictured).

Key board 107 might include a cancel key, an enter key, and/or keys with other alpha-numeric text. In another embodiment, keyboard 107 might contain a key that represents a specific denomination amount, e.g. five dollars ($5) or ten dollars ($10). In another embodiment, keyboard 107 is a programmable keyboard where the denomination represented by a key can be altered for a particular donation session. Hence, an exemplary keyboard layout, i.e. $1, $5, and $10, might be programmed to be $5, $10, and $15. Processing circuitry 903 interfaces with keyboard 107 and associated circuitry 109 via an address bus 536, data bus 533, and control bus 530.

In an alternate embodiment, a key on keyboard 107 might be representative of text. By way of example, a key might represent a particular charity to which the donation is made, and/or a fund within a charity to which a donation is made.

Once a key has been hit on keyboard 107, that key information is moved into a buffer and interrupts processing circuitry 903 to communicate that the key is ready. Circuitry 903 responds to the interrupt by reading the buffered keyboard information. Circuitry 903 then stores the keyboard information in storage 302 if necessary. By way of further example, the keyboard information may consist of a donation amount, an account number of a contributor, an authorization code, and the like.

In one embodiment, keyboard circuitry 109 interrupts processing circuitry 903. Circuitry 903 responds to the interrupt by reading buffered keyboard information, which by way of example, includes donation information and/or card account information concerning the fund to which the donation is made. Circuitry 903 then associates the information via a software routine in one embodiment, and stores the associated information in storage 302. In another embodiment, circuitry 903 takes the associated information and transfers it from storage to a card account processor database.

FIG. 1b is a flow chart illustrating the functionality of an optional contribution communication servicing software and associated hardware of an exemplary donation kettle electronic contributions management terminal of the present invention. Optional contribution communication circuitry servicing routine S1200 is a set of software programs which run on a donation kettle electronic contributions management terminal 100. Routine S1200 is entered when a communication is received by communication circuitry 990 in one embodiment. Upon entering this routine (S1202), communication circuitry 990 enters a retrieve the communication routine S1203 to retrieve the communication. The communication consists of a request for contribution information in one embodiment. By way of example, the request includes a request for a cash contribution entry, an envelope contribution entry, a bar code data entry, a card entry, a contribution entry, or combinations thereof. The request can include a request for a fingerprint entry, a contribution entry, or a combination thereof. In another embodiment, the communication is a request to download. The circuitry 990 then tests to determine if this is a request to download by executing routine S1207. If "yes," then a test to determine if the data storage is empty using routine S1209 is conducted.

If "yes," an end of data message using routine S1212 is sent, and routine S1200 is concluded (S1213).

If there was a "no" in response to routine S1207, routine S1215 is executed. Routine S1215 transmits a please resend request to download message, and then ends (S1227) routine S1200. The request to download can include a security code or other security information. Furthermore, the circuitry 990 may test to see if the proper security code is present within the request to download before downloading any information.

If there was a "no" in response to routine S1209, routine S1217 is executed to obtain the contribution entry. The contribution entry can come from the cash contribution acceptor 320, the envelope contribution acceptor, card contribution processor 160,240, or coin contribution acceptor 1100, or storage 302. Routine S1219 to send the contribution entry is entered. Routine S1219 loops around to routine S1209 until there is no more data to be communicated. Routine S1200 is entered when there is communication between donation kettle electronic contributions management terminal 100 and donation kettle electronic contributions management terminal 120 in one embodiment. In an alternate embodiment, routine S1200 is entered when there is communication between donation kettle electronic contributions management terminal 100 and a printer. Provision can be made in another embodiment, routine S1200 is entered when there is communication with a card account processor, e.g. a third party card processor, a bank, VISA, and the like.

In one exemplary embodiment, a donation kettle 100 contains a card reader 307 and related circuitry 303 addition. Card reader 307 and related circuitry 303 reads information on a card 145, 150 (FIG. 2) and converts card information to a digital sequence of 1's and 0's which correspond to the card information thereon, and stores this information in a buffer. Card reader circuitry 303 interrupts processor 903 and communicates card information to processing circuitry 903. Processing circuitry 903 interfaces with card reader 307 and associated circuitry 303 via an address bus 536, data bus 533, and control bus 530. Specifically, upon detection by reader 307 that a card 145/150 donation is being made, card reader circuitry 303 interrupts processing circuitry 903. Circuitry 903 responds to the interrupt by reading the buffered card information. Buffered card information includes contributor and account information in one embodiment. The card reader might include a reader that reads a magnetically striped card, an IC card, a PCMCIA card, or the like.

FIG. 2b is a schematic block diagram of one embodiment of a donation kettle 100 with a card reader 307 and associated circuitry 303, communication circuitry 990, a receipt generator (a printer 821 and associated circuitry 823). This embodiment has the features generally described herein, as well as those described below.

Preferably, a receipt generator (a printer 821 and associated circuitry 823) is located on or near a donation kettle 100. In an alternate embodiment, the receipt generator may be located at a remote location. The receipt generator produces a receipt for a single donation or a plurality of donations. In one embodiment, a donation kettle 100 communicates, via a communication link, preferably an RF (radio frequency) communication link or an infra-red communication link, with the receipt generator. In another embodiment, a donation kettle 100 communicates donation and contributor information, via a communication link to terminal 120. Terminal 120 then communicates the contributor and donation information to the receipt generator. The communication consists of information about the contributor, the donation, the date, the intention for which the donation was given, and the like. The receipt generator processes the information about the contributor and the donation to generate a receipt. The receipt may be generated automatically by the receipt generator to be picked up by the contributor at or soon after visiting the donation kettle 100, or may be generated for mailing or faxing to the contributor. A contributor of a charitable organization may desire the receipt for tax purposes.

Printer 821 is a thermal printer in one embodiment. In an alternate embodiment, printer 821 is a dot matrix printer, a laser printer, and the like.

The present invention also contemplates locating the receipt generator 820 on a donation kettle electronic contributions management terminal 100, and generating receipt 830 at donation kettle electronic contributions management terminal 100.

In yet another embodiment of the method of the invention a record of the contribution is generated at a card account processor 1031, a bank, or combination thereof, and forwarded to a contributor. A receipt for a contribution appears on a contributor's monthly credit card statement, bank statement, or combination thereof. Optionally, an annual, or after some other appropriate time period, a statement is forwarded to a respective contributor itemizing all contributions and gifts given, e.g. to charitable organizations, for tax purposes, or otherwise. The format of the statement can be such that a tax processing entity, e.g the IRS, will accept the information for substantiating the contribution or group of contributions and gifts at issue, and/or grant a charitable contribution deduction. It will be understood that records of the contribution transactions made by tens of hundreds of cardholder contributors can easily be processed and forwarded to each respective contributor of the tens of hundreds of contributors for meeting contribution quotas and for substantiating charitable contribution deductions and the like given at a plurality of donation kettle electronic contributions management management terminals 100.

Figure 3:
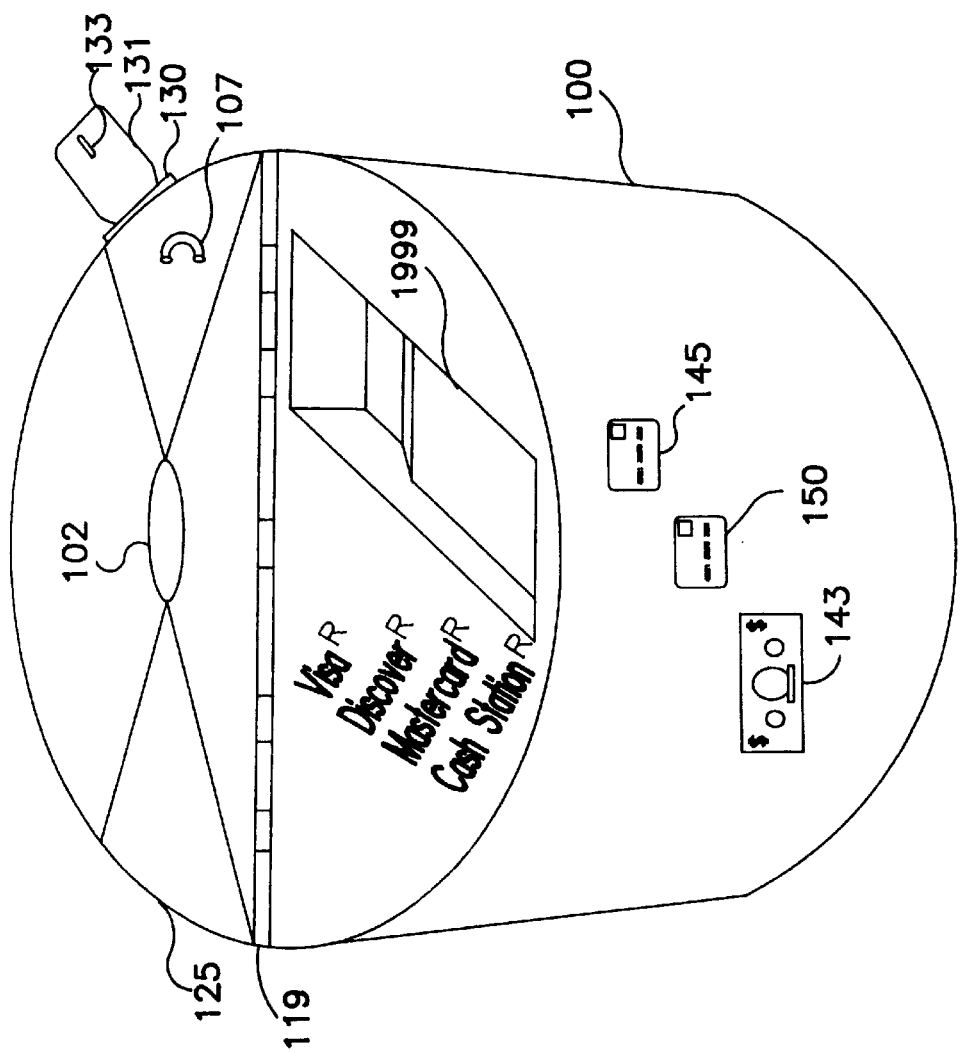
FIG. 3 is a perspective view of an embodiment of an exemplary donation kettle with a card donation processor docking station, a card donation processor with a keyboard, and a display, a terminal, a cash donation, a credit card donation, a debit card donation, and a locking assembly.
Figure 3:
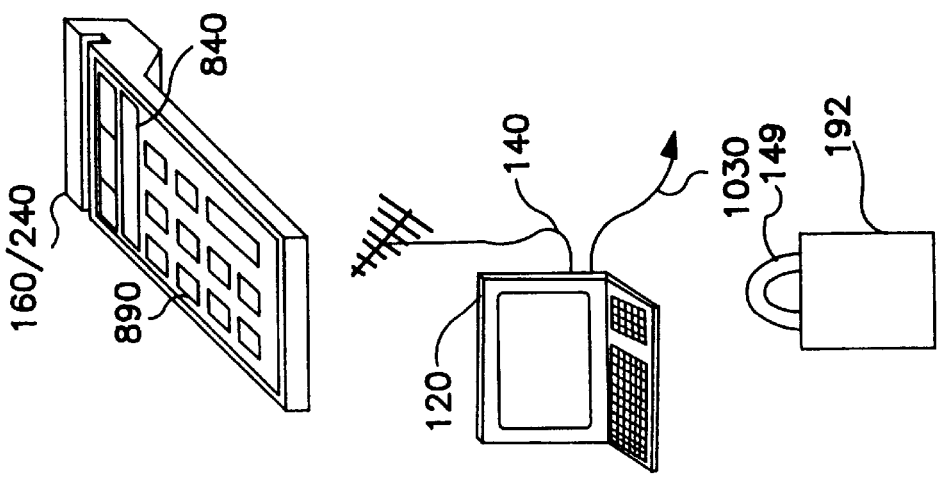

FIG. 3 is a perspective view of an embodiment of a donation kettle 100 with a card donation processor docking station 1999, a card donation processor 160/240, a keyboard 890, a display 840, terminal 120, a cash donation 143, a credit card donation 145, and a debit card donation 150. This donation kettle 100 has the features described above, with the addition of a donation kettle docking station 1999.

Donation kettle docking station 1999 allows for a card donation processor 160/240 to be docked. In one embodiment card donation processor 160/240 is communicatively attached to docking station 1999 to allow card account and/or contributor information to be transmitted via docking station 1999 to, by way of example, terminal 120 (via communication link 140), to a card account processor directly via communication link 140), to another donation kettle 100, and/or a combination thereof. In one embodiment a plurality of docking stations 1999 are networked.

Docking station 1999 can also be used to communicatively attach a card reader 307 and related circuitry 303 (FIG. 2b) to a donation kettle 100. Moreover, a donation kettle 100 docking station 1999 may also be located on the interior or exterior of a building and/or a permanently mounted donation kettle stand 153 (FIG. 2).

In one embodiment, docking station 1999 provides a means for the power source 1437 of card reader 307 and related circuitry 303 (FIG. 2a) to be energized or recharged.

In another embodiment, docking station 1999 provides a communication link between card reader 307 and related circuitry 303 (FIG. 2b) and/or a card account processor.

In another embodiment docking station 1999 includes a slide in mounting unit (not pictured) in a donation kettle 100 onto which a card processor 160/240 is connected. In an embodiment, card processor 160/240 slides into docking station 1999, and plugs into the docking station 1999. In an alternate embodiment, docking station 1999, and/or a card processor 160/240 contain a base mount (not pictured). The base mount includes a plate on the bottom or side of card donation processor 160/240 (not pictured). In one embodiment, the plate is offset from the bottom of card processor 160/240. The plate allows card processor 160/240 to slide into docking station 1999.

In an alternate embodiment, card processor 160/240 is permanently mounted in docking station 1999. In an alternate embodiment docking station 1999 acts as a surface on which a portable card processor 160/240 rests without an electrical connection. Processor 160/240 is taken from the docking station 1999 surface after a donation session and linked to a card account processor database via a communication link. In one embodiment, docking station 1999 can be molded into the body of donation kettle 100.

In yet another embodiment, card processor 160/240, and/ or docking station 1999 contains an electrical connector (not pictured) that provides sufficient connection to provide a communication link to move data. Numerous communication links discussed above can also be used to provide connections to move data.

In various embodiments, docking station 1999, terminal 120, card processor 160/240 or a combination thereof are on the same network. Downloading information from the devices on the network is directed to a terminal 120 in one embodiment, to a modem in another embodiment, or to a card account processor database in yet another embodiment.

In an embodiment, a hinge 119 is provided. Hinge 119 allows surface 125 to pivot along the hinge axis. When surface 125 is raised, access to the center retaining area 200 (FIG. 5) of donation kettle 100 is allowed.

A locking assembly consists of a hinge 130, a surface 131 on which slot 133 is disposed, a loop member 137, and padlock 192. Surface 131 pivots along the axis of hinge 130. In one position loop 137 penetrates slot 133. Loop member 149 on padlock 192 goes through loop member 137 allowing surface 125 to be secured. The present invention also contemplates the use of other forms of locking assemblies commonly known in the art.

Figure 3A:
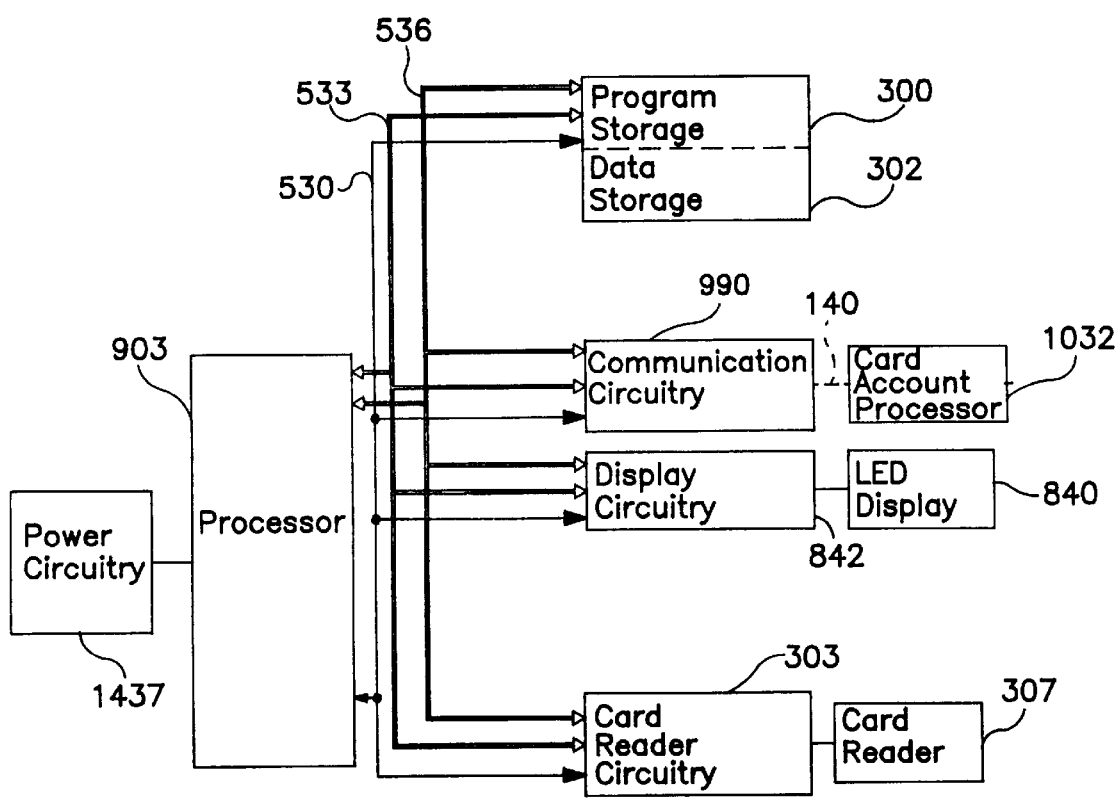
FIG. 3a a schematic block diagram of one embodiment of a donation kettle with communication circuitry, a display and associated circuitry, a card account processor database.

FIG. 3a a schematic block diagram of one embodiment of a donation kettle 100 with card reader 307 and associated circuitry 303, communication circuitry 990, a display 840 and associated circuitry 842. This embodiment includes communication link 140. Communication link 140 allows information to be communicated to a card account processor database 1032. In one embodiment, card account processor 1032 database receives card account information and/or donation amount information from a single card reader 307 and associated circuitry 303. In an alternate embodiment, card account processor 1032 database receives card account information and/or donation amount information from a networked group of card readers 307 and associated circuitry.

Figure 4:
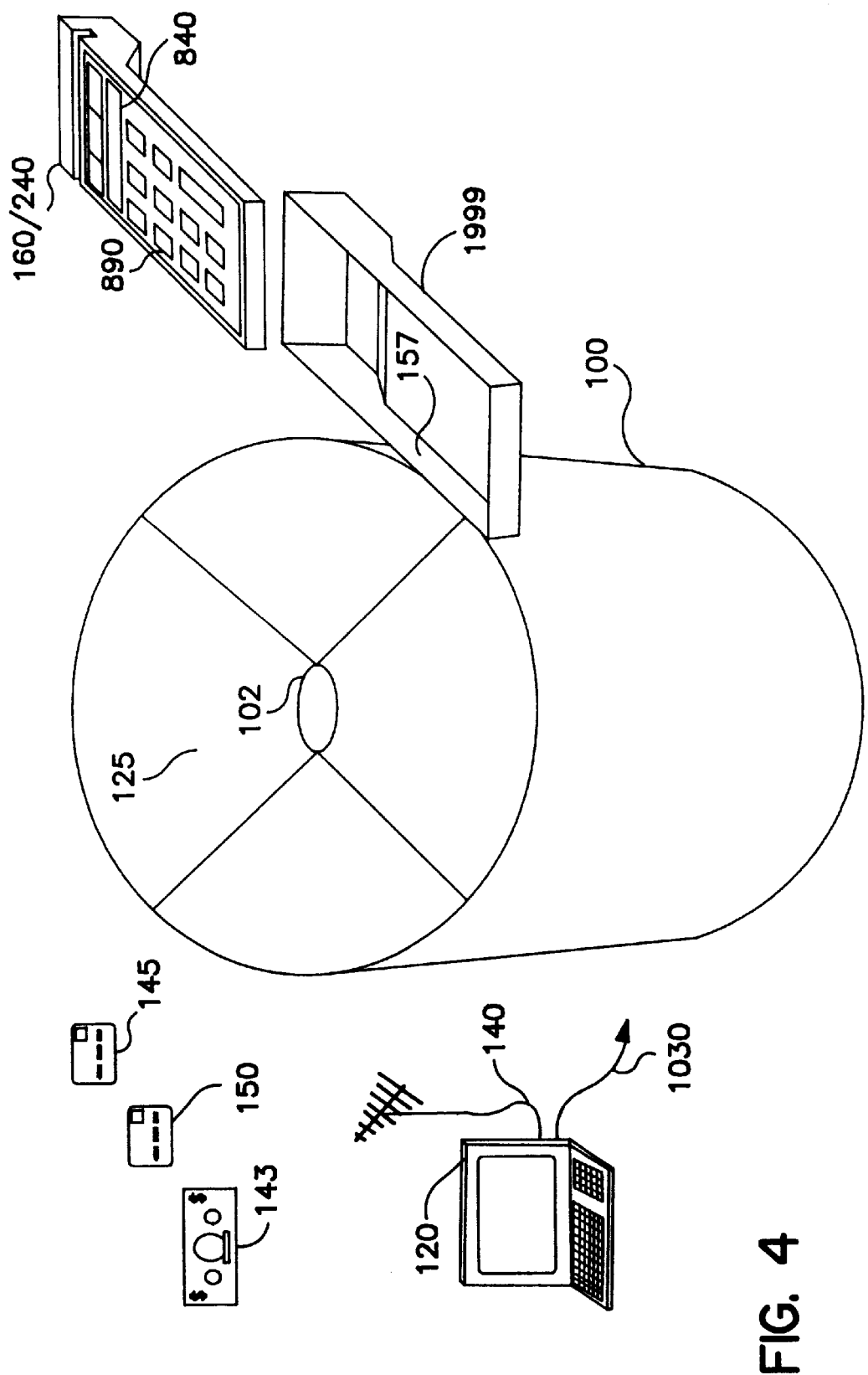
FIG. 4 is a perspective view of an embodiment of an exemplary donation kettle, a slot for accepting cash and/or a coin donation, a card donation processor docking station, a card donation processor with a keyboard and a display, a terminal, a cash donation, a credit card donation, and a debit card donation.

FIG. 4 is a perspective view of an embodiment of an exemplary donation kettle 100 with a card donation processor docking station 1999, a card donation processor 160/240, a keyboard 890, a display 840, surface 125 containing slot 102, terminal 120, a cash donation 143, a credit card donation 145, and a debit card donation 150. This exemplary donation kettle 100 has the features described herein, with the addition of a donation plate docking station 1999 located on the side of donation kettle 100.

Docking station 1999 is constructed of plastic, metal, wood, or any other material appropriate to create a surface on which card donation processor 160/240 rests. Docking station 1999 is fastened to the side of donation kettle via fastening means 157. By way of example, fastening means 157 includes adhesive, rivets, snaps, velcro, or screws. It will be appreciated that this embodiment of the invention allows a donation kettle 100 to be retrofitted with card account processor 160/240 in order to allow card 145/150 donations to be obtained. In an alternate embodiment card processor 160/240 includes a clip (not pictured) or other appendage (not pictured) allowing for the card processor 160/240 to be mounted to donation kettle 100.

Similarly, docking station 1999 as described in these embodiment can also be used with a worship terminal described in U.S. application, Ser. No. 08/194,204 filed Feb. 8, 1994, (Attorney's docket No. 94 P 09), and an offering plate described in U.S. application, Ser. No. 08/127,770, (Attorney's docket No. 28270/31676), filed Sep. 28, 1993, which is a continuation-in-part of U.S. application, Ser. No. 08/117,909, (Attorney's docket No. 93 P 07), filed Sep. 7, 1993, by Witold A. Ziarno.

Figure 5:
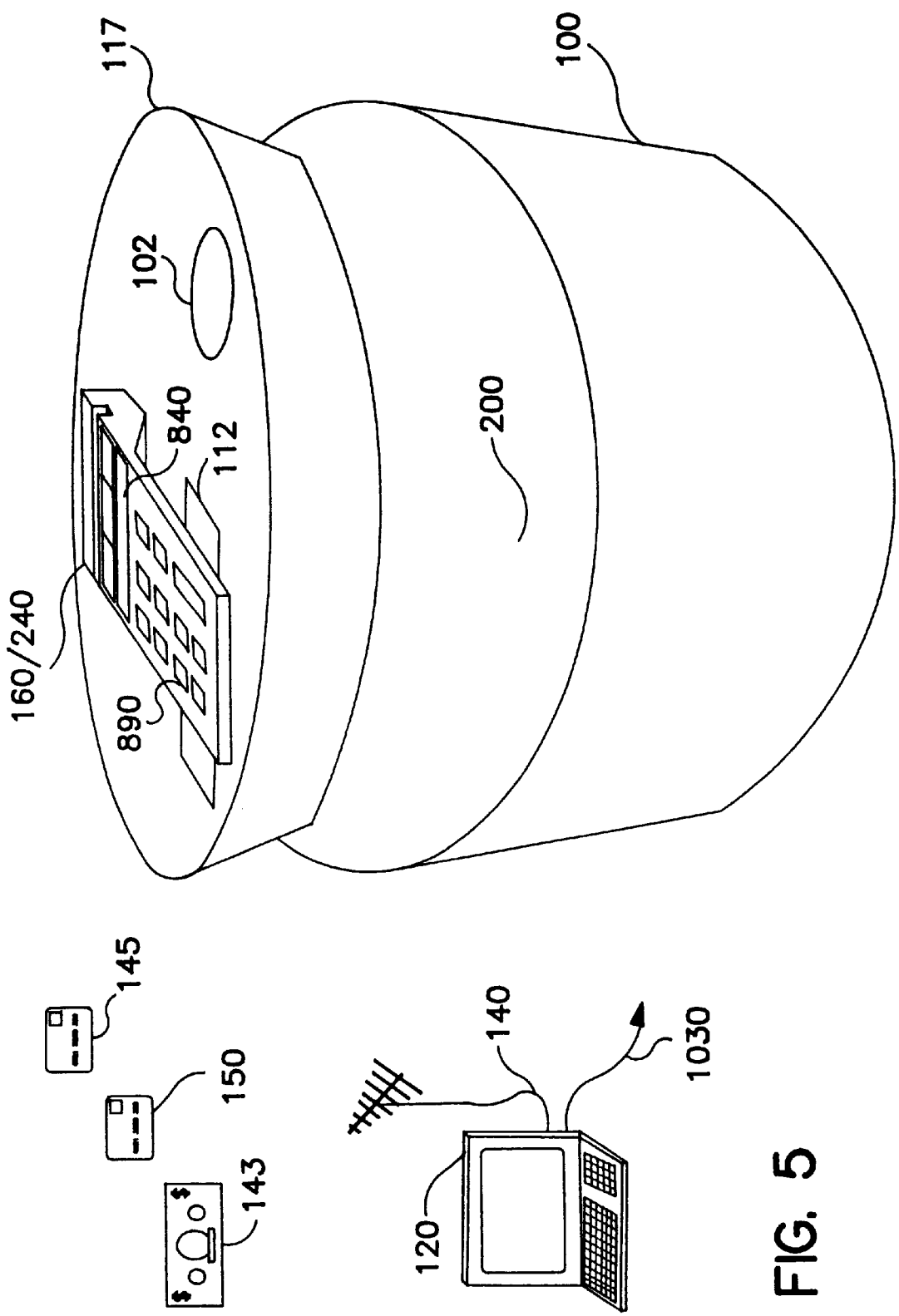
FIG. 5 is a perspective view of an embodiment of an exemplary donation kettle, and a removable surface containing a card donation processor, a means for mounting a card donation processor on the surface, a slot for accepting cash and coin donations, and a credit card, debit card, and cash donation.

FIG. 5 is a perspective view of an embodiment of an exemplary donation kettle 100 with surface 117, a card processor 160/240, a velcro member 112, and a slot 102. Kettle 100 has the features described herein.

In this embodiment, donation plate 100 has added to it a surface 117. Surface 117 contains a slot 102 into which cash 143 or a coin donation (not pictured) can be donated. Surface 117 acts as a barrier to theft and can be mounted permanently on donation kettle 100 in one embodiment. Surface 117 can be constructed from metal, wood, or any other material appropriate to act as a theft deterring barrier.

In an alternate embodiment, surface 117 is removable. The side wall of surface 117 and the inner side wall of donation kettle 100 is threaded, allowing for surface 117 to screw into kettle 100. In yet another embodiment, surface 117 is fastened to kettle 100 by means of snaps, screws, or a combination thereof.

Velcro surface 112 comes into contact with a sister velcro surface (not pictured) on the underside of card processor 160/240. This contact allows for card processor 160/240 to be removably mounted to surface 117.

Figure 10:
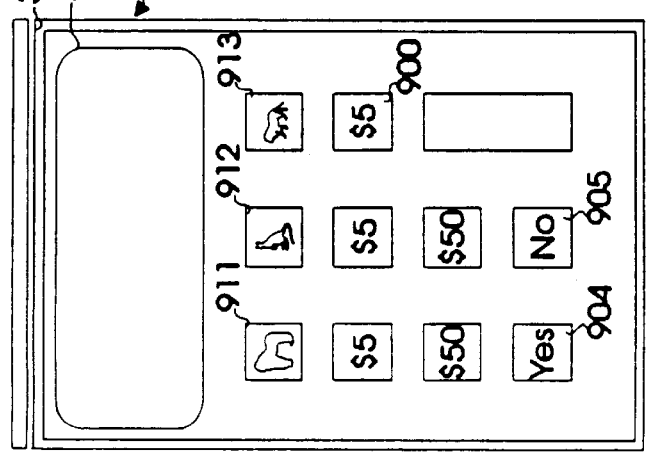

FIG. 10 illustrates a face of terminal 100 used for simplifying and inducing the giving of contributions and gifts by contributors to a plurality of donation kettle electronic contributions management organizations or causes, e.g. Save the Apes, Save the Kangaroos Fund, and Save the Lions Fund. Optionally, donation kettle electronic contributions management management terminal 100, with a face, is used to induce, solicit, facilitate, and receive contributions and gifts for a plurality of causes within a specific donation kettle electronic contributions management organization. The terminal face used with terminal 100 is used in method of simplifying and inducing the giving of contributions and gifts, receiving and immediately recording thereof upon receipt.

The method comprises the steps disclosed herein comprising providing the contributors making monetary contributions and gifts with a portable hand-held terminal 100, preferably held in a palm of the hand, for making of record information of the contribution transaction, e.g. card information and numerical contribution amount information. The terminal 100 has its own source of electric power 1437 (FIGS. 2–2b) and a plurality of entry keys manually operable or activated for entering the amount of the contribution to be given (or a touch sensitive screen input). The terminal also has a reader 307 on the terminal 100 for reading an information -bearing card having indicia thereon identifying the cardholder who is the contributor giving the monetary contribution and an optional visual display 840. Display 840 displays the amount entered by manual operation of entry keys for entering the designated monetary amount contributed. Terminal 100 has means therein for recording the amount of the contribution including means for storing the amount correlated to the indicia read on an information bearing card of the corresponding contributor. The correlated amount and indicia read by the reader are for eventual off-loading thereof. Terminal 100 has means for associating or correlating the amount correlated to the indicia read on the record of the corresponding contributor with information representative of a particular cause, donation kettle electronic contributions management organization, account within a fund raising organization, or combination thereof. There is also an association or correlation with a respective contributor's information bearing card information, respective contributor's numerical contribution information, and a particular cause, donation kettle electronic contributions management organization, account within a fund raising organization, or combination thereof.

By way of further example, terminal 100 has a key associated with indicia representative of a particular a particular cause, gift recipient, account within a fund raising organization, or combination thereof. The key 911 represents a key (or portion of a touch sensitive screen) that designates a contribution to a "Save the Apes" fund or account, key 912 represents a key the designates a contribution to a "Save the Kangaroos" fund or account, and key 913 represents a key the designates a contribution to a "Save the Lions" fund or account. A contributor designates which fund he wishes his contribution to go to, e.g. by pressing key 912 "Save the Kangaroos" fund or account; key 913 represents a key which designates a contribution to a "Save the Lions" fund or account; or, key 911 represents a key the designates a contribution to a "Save the Apes" fund or account. The contributor's card information and designated contribution monetary amount is associated with his cause designation.

Terminal 100 stores the associated and designated information for eventual off-loading thereof. Off-loading is to donation kettle electronic contributions management terminal 120, a card account processor 1031, a funds processing network, or combination thereof. The contributor's associated card information, contribution amount and designation is then routed to a particular account. An account can be a separate account within a donation kettle electronic contributions management organization group of accounts, an account of a particular donation kettle electronic contributions management organization within a group of donation kettle electronic contributions management organization accounts, or combination thereof. In a variant, all of the designated contribution monetary amounts are funnelled to a single account.

Provision can be made for a prompt on display 840 prompts a contributor to enter his card information. A contributor enters his card information which is read by a reader 307. Another prompt on display 840 prompts the contributor to select a particular cause to which he wishes make a contribution. For example, the contributor selects key 911 representing a "Save the Apes fund or account." The contributor is prompted to enter a numerical contribution amount. For example, the contributor selects $50. The contributor's selection of a numerical contribution amount, e.g. $50, and selection of, e.g. "The Save the Apes Fund," are associated or correlated with the contributor's card information from his respective information bearing card, and stored in the terminal 100 data storage. A plurality of contributors make their subsequent selections. The associated information, e.g. card information from each respective contributor, contribution information from each respective contributor, and designation of cause, fund, or account, are then stored in data storage for eventual off-loading from terminal 100. Off-loading can be to a donation kettle electronic contributions management terminal 120, a card account processor 1031, a fund-processing data base, a bank, or combination thereof, for further processing. It will be appreciated further post contribution processing can include preparation of a record substantiating the contribution that is then forwarded to the contributor for tax purposes and the like.

The keys 911, 912, and 913 can represent organizations such as the American Red Cross, American Cancer Society, American Diabetes Society, or other donation kettle electronic contributions management organization. As will be appreciated contributions and gifts can be gathered at funeral homes, hospitals, charitable balls, concerts, and the like, for these various causes.

Figure 12:
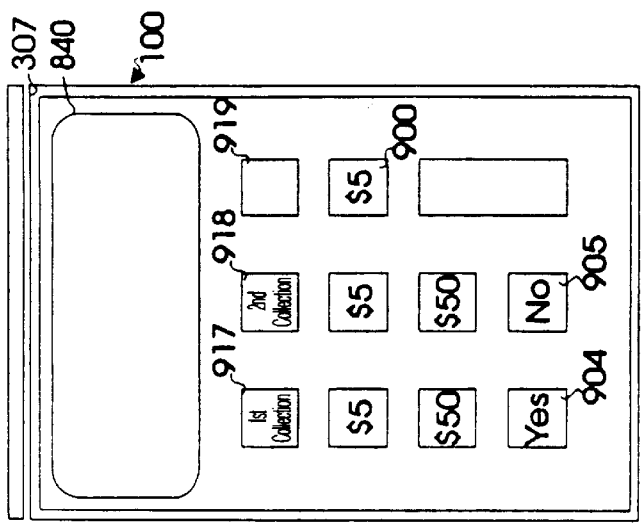
FIGS. 10–12 are perspective views of user interfaces of electronic devices of the present invention.
Figure 11:
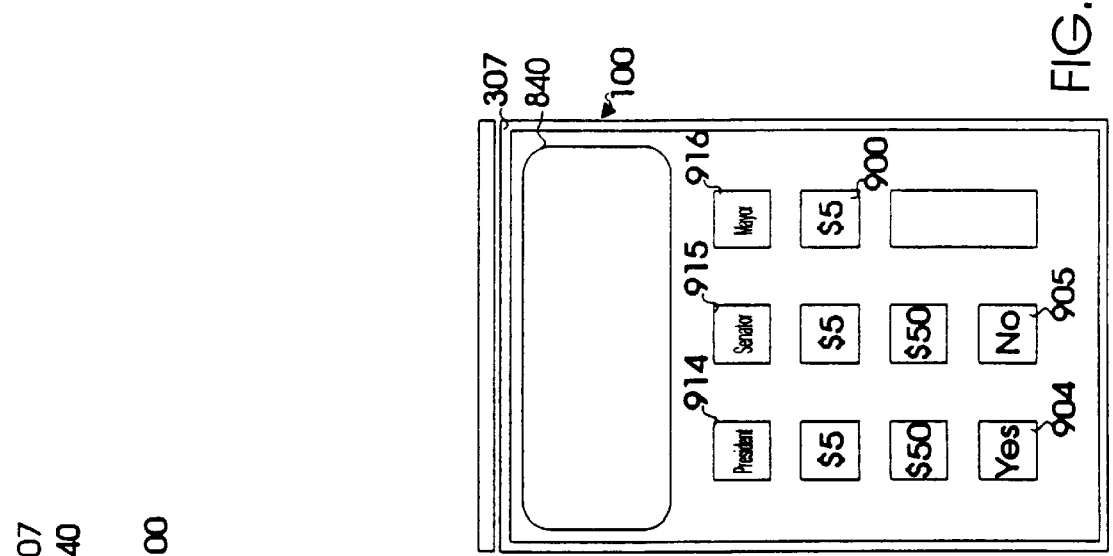

FIG. 12 illustrates a face of a terminal 100 used for simplifying and inducing the giving of contributions and gifts by contributors to causes within a religious organization, e.g. First collection, Second Collection, and Cardinal's Appeal. This face is used with a terminal 100 and used in the method of simplifying and inducing the giving of contributions and gifts, receiving and immediately recording thereof upon receipt. The method comprises the steps disclosed herein comprising providing the contributors making monetary contributions and gifts with a portable hand-held terminal 100 for making of record data of the contribution transaction, e.g. cardholder card information and numerical contribution amount information. The terminal 100 has its own source of electric power 1437 and a plurality of entry keys manually operable for entering the amount of the contribution to be given in one embodiment. The terminal 100 as illustrated in FIGS. 10–12 is a type of terminal accepting transactions by way of information bearing cards. Preferably, terminal 100 is a portable hand-held terminal, however, terminal 100 can also be a personal computer with a display, keyboard, memory, communication circuitry, a personal data assistant (PDA) device, such as a Motorola envoy device, an Apple Newton, a lap top computer, a notebook computer, a palm top computer, or a standard personal desk top computer. The terminal also has a reader 307 on the terminal 100 for reading an information bearing card having indicia thereon identifying the contributor making the monetary contribution and an optional display 840. Display 840 displays the amount entered by manual operation of entry keys. Terminal 100 has means for recording the amount of the contribution including means for storing the amount correlated to the indicia read on an information bearing card of the corresponding contributor. The correlated amount and indicia read by said reader are for eventual off-loading thereof. Terminal 100 has means for associating the amount correlated to the indicia read on the record of the corresponding contributor with information representative of a particular cause, account within a religious organization, or combination thereof. It is also possible to make an association or correlation with a respective contributor's information bearing card information, respective contributor's numerical contribution information, and a particular cause within a religious organization.

Provision can be made wherein a religious organization designates to which collection, or cause, a sub-group of contribution transactions within a group of contribution transactions made during a session. Terminal 100 provides for the designation or grouping of a sub-group of contribution transactions for a particular collection of cause. Terminal 100 has a key, or code that is entered by, associated with indicia representative of a particular collection. Where a code representative of a particular collection is used, the code is associated or correlated with a group of respective contribution transactions. The code is entered by an individual prior to a particular portion of a contribution session. In a variant the code is correlated to a chronological time period during a portion of the contribution session.

A key 911 represents designation of a contribution to the "First Collection" fund or account, a key 912 represents a key the designates a contribution to a "Second Collection" fund or account, and key 913 represents a key that designates a contribution to a "Cardinal's Appeal" fund or account. A contributor designates which fund he wishes his contribution to go to, e.g. by pressing the key 912, key 913 or, key 911. The contributor's card information and contribution amount is associated with his designation. Terminal 100 stores the associated and designated information in data storage for eventual off-loading thereof. Off-loading is to donation kettle electronic contributions management terminal 120, a card account processor 1031, a funds processing network, or combination thereof. The contributor's associated card information, contribution amount and designation is then routed to a particular account. Such an account can be a separate account within a religious organization, an account of a cause within a group of religious organization accounts, or combination thereof.

Furthermore, a prompt on a display 840 prompts a contributor to enter his card information. A contributor enters his card information which is read by reader 307. Another prompt on display 840 prompts the contributor to select a particular cause to which he wishes make a contribution for. Assume the contributor selects the key 911 representing the "First Collection." Collections include, by way of example, a capital improvement fund collection, a school fund collection, a Cardinal's appeal collection, a collection for the missions overseas, or combination thereof. The contributor is prompted to enter a numerical contribution amount. Assume the contributor selects $50. The contributor's selection of a numerical contribution amount, e.g. $50, and selection of a cause are associated with the contributor's card information from his respective information bearing card, and stored in terminal 100 data storage. A plurality of contributors make their subsequent selections. The associated information, e.g. card information from each respective contributor, contribution information from each respective contributor, and designation of cause, fund, or account, are then stored in data storage for eventual off-loading from terminal 100. Off-loading is to donation kettle electronic contributions management terminal 120, a card account processor 1031, a fund-processing data base, a bank, or combination thereof, for further processing. As will be appreciated further processing can include preparation of a record substantiating the contribution that is then forwarded to the contributor for tax purposes and the like.

The invention provides a method of obtaining contributions and gifts. The method simplifies the way a contribution is given and induces the giving of successive contributions with the immediate recordation thereof. A portable hand held terminal 100 is provided for receiving and immediately recording a contribution given in combination with the donation kettle. The contribution is made by use of card information from an information bearing card 145/150. As described above, information bearing card 145/150 is a credit card 145, debit card 150, or combination thereof.

A first contributor 1 approaches portable electronic terminal 100 for making of record data of a contribution. The contribution is made the contributor using an information bearing card such as a credit card 145, debit card 150, or combination thereof. Preferably terminal 100 has its own source of electric power 1437 and a plurality of optional keys (as described above) manually operable for entering the amount of the monetary contribution to be given, designate a cause, etc. In a preferred embodiment, terminal 100 has a case dimensioned for being held in the palm of contributor 1's hand 1R or dimensioned for removable retention on the kettle. The terminal 100 has a reader 307 disposed on terminal 100 for reading a card record medium, e.g. an information bearing card. The card record medium has indicia identifying a contributor 1 making a given monetary contribution. The terminal has means for making a visual display 840 of the amount entered by manual operation of entry keys. Terminal 100 also has means for recording the amount of the contribution, e.g. data storage 302, including means for storing the amount of the contribution correlated to the indicia read on the record medium, e.g. information bearing card, of the corresponding contributor 1. The correlated amount and indicia read by reader 307 are for eventual off-loading from the terminal 100.

By way of example, contributor 1 is provided terminal 100 by a card account processor, a bank, a donation kettle electronic contributions management organization, a manufacturer, third party account processor, or a combination thereof. Contributor 1 enters is card information by way of card reader 307 disposed on terminal 100. The contributor 1 takes his information bearing card, e.g. a credit card 145, debit card 150 or combination thereof, with his fingers on his hand, and passes it through card reader 307 disposed on terminal 100. The reader 307 reads information on contributor 1's information bearing card and immediately records and stores it in a data storage. Contributor 1 then enters a contribution amount, a designation for a particular cause the contribution is for, or combination thereof. The contributor 1 can press a single key disposed on terminal 100, e.g. a $5 key, to enter a contribution monetary amount. The contributor 1 can press a combination of keys on a keyboard disposed on the terminal 100 to designate a contribution amount, e.g. $35.71. Contributor 1's contribution amount and respective card information are electronically correlated, and immediately stored in a data storage on terminal 100. Contributor 1 can enter card information with a single information bearing card or with multiple information bearing cards.

The second contributor 2 approaches terminal 100. Contributor 2 enters his respective card information by way of card reader 307 disposed on the terminal 100.

The contributor 2 takes his information bearing card, e.g. a credit card 145, debit card 150 or combination thereof, and passes it through card reader 307 disposed on terminal 100. The card reader 307 reads information on contributor 2's respective information bearing card and immediately records and stores it in a data storage. Contributor 2 then enters a contribution amount, a designation for a particular cause the contribution is for, or combination thereof. The contributor 2 can press a single key disposed on terminal 100, e.g. a $10 key, to enter a contribution amount (FIGS. 10, 11). Optionally, contributor 2 can press a combination of keys on a keyboard disposed on terminal 100 to designate a contribution amount, e.g. $77.73. Contributor 2's contribution amount and respective card information are correlated, and stored in a data storage on terminal 100.

The process is repeated for each respective subsequent and successive contributor. For example, contributor N approaches terminal 100 after contributor 2. Contributor N enters his respective card information by way of card reader 307 disposed on terminal 100.

Contributor N takes his respective information bearing card, e.g. a credit card 145, debit card 150 or combination thereof, and passes it through card reader 307 disposed on terminal 100. The reader 307 reads information on contributor N's respective information bearing card and immediately records and stores it in a data storage. Contributor N then and enters a contribution amount, a designation for a particular cause the contribution is for, or combination thereof. The contributor N may press a single key disposed on terminal 100, e.g. a $50 key, to enter a contribution amount. Optionally, contributor N may press a combination of keys on a keyboard disposed on terminal 100 to designate a contribution amount, e.g. $99.73. Contributor N's contribution amount and respective card information are correlated, and stored in a data storage on terminal 100.

For example, several hundred contribution transactions ("L" contribution transactions) can be made sequentially in the manner on a first terminal $100_1$. A plurality of terminals 100, e.g. terminal $100_1$ . . . through terminal $100_Z$ are circulated. Each respective terminal 100 can collect "L" contribution transactions. The result is that "L" contribution transactions times "Z," the number of fund raising management terminals, gives (Q) total contribution transactions received. L*Z=Q. In one variant of the invention, it will be understood that (Q), e.g. tens of hundreds of contribution transactions, have been received before interposing a request for verification or authorization, authorization step, verification step, or a combination thereof, between two respective contribution transactions within the group of contribution transactions (Q) during a contribution session.

In the scenario where contributor 1 has contributed contributor 1's respective contribution amount of $5.00, and his respective card information; where contributor 2 has contributed his respective contribution amount of $10.00 and his respective card information; and, where contributor 3 has contributed his respective contribution amount of $50.00 and his respective contribution amount, contributor N has contributed his respective contribution amount of $100.00 and his respective card information, data storage in terminal 100 stores the following:

| | |
|---|---|
| Contributor 1's card information | $5.00 |
| Contributor 2's card information | $10.00 |
| Contiibutor 3's card informafion | $50.00 |
| Contributor N's card informafion | $100.00 |

Subsequently, terminal 100 transmits:
Contributor 1's card information and associated $5.00
Contributor 2's card information and associated $10.00
Contributor 3's card information and associated $50.00
Contributor N's card information and associated $100.00
to donation kettle electronic contributions management terminal 120 via docking station 1999. That is a communication link is established between terminal 100 and terminal 120 for the transmission of the information above. Terminal 120 stores the information:

Contributor 1's card information and associated $5.00
Contributor 2's card information and associated $10.00
Contributor 3's card information and associated $50.00
Contributor N's card information and associated $100.00

Terminal 120 then transmits the information, including optional information identifying a donation kettle electronic contributions management organization, an account of a fund raising organization, or combination thereof, via communication link 1030, by way of example a telephone line, to card account processor 1031 or a funds processing network.

Optionally, an authorization is obtained at card account processor 1031 for each contribution transaction. By way of example, information designating each contribution transaction as authorized or unauthorized may be added to each respective contribution:

Contributor 1's card information and associated $5.00—unauthorized

Contributor 2's card information and associated $10.00—authorized

Contributor 3's card information and associated $50.00—authorized

Contributor N's card information and associated $100.00—authorized

The authorized contribution transactions are then processed further. Processing includes debiting or charging, as appropriate, an account of a contributor for the amount of the authorized contribution. By way of example, Contributor 2's account is debited $10.00;
Contributor 3's account has a charge added to it of $50.00; and,
Contributor N's account has a debit entered to it of $100.00.

An account of a donation kettle electronic contributions management organization is augmented the amount of the authorized contributions and gifts. By way of example, fund raiser's account 1033 would be augmented for the $10.00 received from contributor 2, for the $50.00 received from contributor 3, and for the $100.00 received from contributor N.

Contributor 1's contribution was unauthorized. As an unauthorized contribution it may be reported to the fund raising organization. The fund raising organization may choose to follow up with Contributor 1 to determine if the contributor would like to make a subsequent contribution. Optionally, contributor 1's card information and respective contribution amount of $5.00 may be discarded.

Optionally, as each contributor, e.g. 1,2, . . . N, enters his respective card information and respective contribution amount on terminal 100, terminal 100 transmits each respective card information and respective contribution amount for each contributor to terminal 120, which is remote from terminal 100. Terminal 120 then stores a back-up copy of each contribution transaction, e.g. respective contributor contribution amount information and card information in a data storage. Optionally, each respective contributor's card information and numerical information of a monetary contribution amount is stored in terminal 120 in a group for eventual transmission thereof to a card account processor 1031 via communication link 1030. Optionally, terminal 100 transmits card information and contribution amount information after a certain minimum threshold value has been reached. By way of example, terminal 100 transmits this information after a threshold contribution level of, for example, $500.00 or $1000.00 has been reached. Optionally, every time a threshold amount has been reached a transmission via a communication link to donation kettle electronic contributions management terminal 120, card account processor 1030, a bank, or combination thereof is made. As described previously, a communication link can include a mobile telephone cellular link, a communication link incorporating pager technology, a communication link to a satellite, and the like.

In yet a further embodiment, a group of contribution transactions are forwarded from terminal 100 to terminal 120, terminal 120 makes a copy of the contribution transactions and then automatically initiates a downloading procedure to card account processor 1030, a bank, a fund processing network, or combination thereof. As is appreciated the electronic device 100 is also used with monetary gifts as well as donations and contributions.

It will be appreciated that this back-up feature will decrease the risk of loss of card information and contribution amount information in the event that terminal 100 is accidentally damaged or malfunctions.

By way of example, in the scenario where contributor 1 has entered his respective contribution transaction, terminal 100 transmits contributor 1's respective contribution transaction to terminal 120 (which is remote from the vicinity of where terminals 100 are used with group 4000 via a wireless communication link 140. Terminal 120 stores contributor 1's contribution transaction in a data storage for eventual transmission to card account processor 1031. Terminal 100 retains a record of contributor 1's contribution transaction. Terminal 120 retains a copy of contributor 1's contribution transaction. Optionally, the copy of contributor 1's transaction in terminal 100's data storage can be compared to the copy in terminal 120's data storage.

Contributor 2 enters his contribution transaction. Terminal 100 transmits contributor 2's respective contribution transaction to terminal 120 (which is remote in this example) via a wireless communication link 140. Terminal 120 stores contributor 2's contribution transaction in a data storage for eventual transmission to card account processor 1031. Terminal 100 retains a record of contributor 2's contribution transaction. Terminal 120 retains a copy of contributor 2's contribution transaction. Optionally, the copy of contributor 1's transaction in terminal 100's data storage can be compared to the copy in terminal 120's data storage. Optionally, contributor 1's and contributor 2's contribution transactions are grouped together for eventual transmission to card account processor 1031.

If the terminal 100 is accidentally damaged as it makes its way to contributor N so that it is no longer operational and so that it has lost the contribution data in data storage 302. It will be appreciated that since a "copy" of the contribution transactions of contributor's 1 and 2 are retained in terminal 120, these contribution transactions can still be submitted to card account processor 1031 for processing, whereas lack of this back up feature would have resulted in the loss of the contribution transactions made by contributor's 1 and 2. It will be understood that this feature will provide a great deal of security in the event there are thousands of dollars of contribution transactions received by terminal 100 and terminal 100 is lost, damaged, or stolen.

A method of reducing the risk associated with the damage to data storage of a portable terminal 100, or the loss, or theft of terminal 100, is also provided. A contributor 1 enters his contribution transaction into portable a terminal 100. A record of the contribution transaction is retained in terminal 100. A single contribution transaction, or a preferably a plurality of contribution transactions, are transmitted to terminal 120 via communication link 140, preferably a wireless communication link. Terminal 120 stores a "copy" of the single contribution transaction, or a "copy" of a plurality of contribution transactions in a data storage. Eventually, terminal 120 transmits a single contribution transaction or a group of contribution transactions to a card account processor 1031 for processing.

Optionally, the original single contribution transaction, or plurality of contribution transactions, are transmitted to terminal 120 from terminal 100 and no record copy of the transaction is retained in terminal 100 data storage. It will be understood that the transmission of contribution transaction data to remote terminal 120 from terminal 100, as terminal 100 is being used in the field for gather contribution transactions, allows for memory 302 to be cleared and freed up for additional contribution transactions to be made on terminal 100. This method allows for terminal 100 to gather a multiplicity of contribution transactions with limited memory and allows for a terminal to be manufactured with limited memory requirements.

Figure 6:
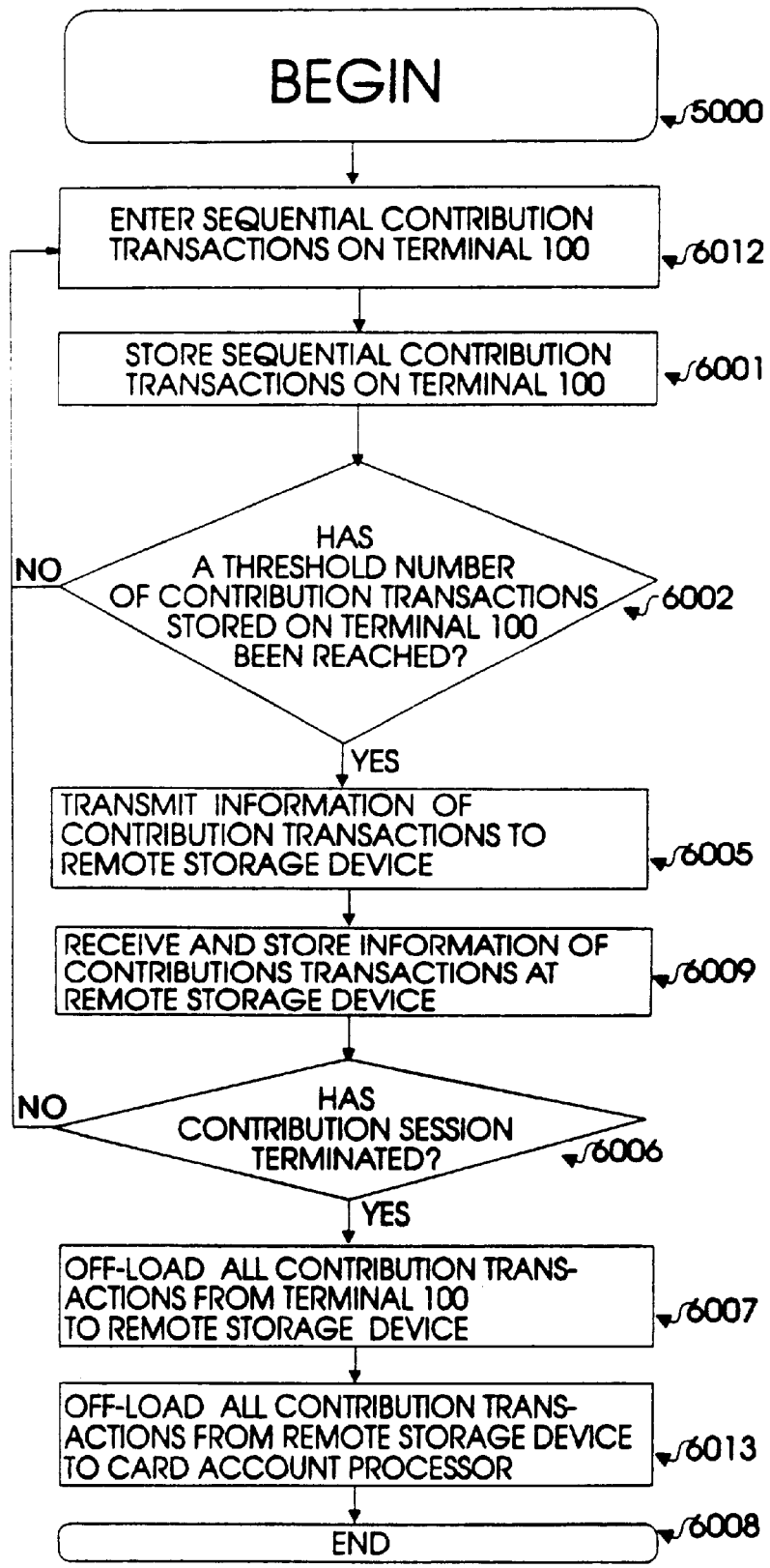
FIG. 6 is an illustration of a software routine of the present invention.

As illustrated in FIG. 6, the invention also provides a method of safe-guarding and minimizing the risk of loss of contribution transaction information from terminal 100 via a software routine and associated hardware. Routine 5000 begins the method. Routine 6001 stores sequential contribution transactions on terminal 100. Routine 6002 determines if the number of sequential, cumulative contribution transactions stored on terminal 100 has reached a minimum or maximum threshold value, e.g. 50 contribution transactions, 100 contribution transactions, 200 contribution transaction, etc. In a variant routine 6002, determines if the dollar value of the sequential cumulative contribution transactions has reached a threshold value. If yes, terminal 100 transmits information of the sequential, cumulative contribution transactions to a remote terminal, e.g. a donation kettle electronic contributions management terminal 120, or to another terminal 100, for storage. It will be understood that identical or substantially identical records of contribution transactions are stored in both terminal 100 and the remote terminal. Routine 6006 determines if the contribution session has ended. If yes, routine 6004 is executed to download the record of the contribution transactions in terminal 100 to a remote terminal. If no, routine 6001 is executed to continue storing sequential contribution transactions on terminal 100. In a variant, the contribution transaction data downloaded after the termination of the contribution session is compared to the record copy of the contribution transaction data that was sequentially transmitted for storage to the remote terminal for accuracy.

Figure 7:
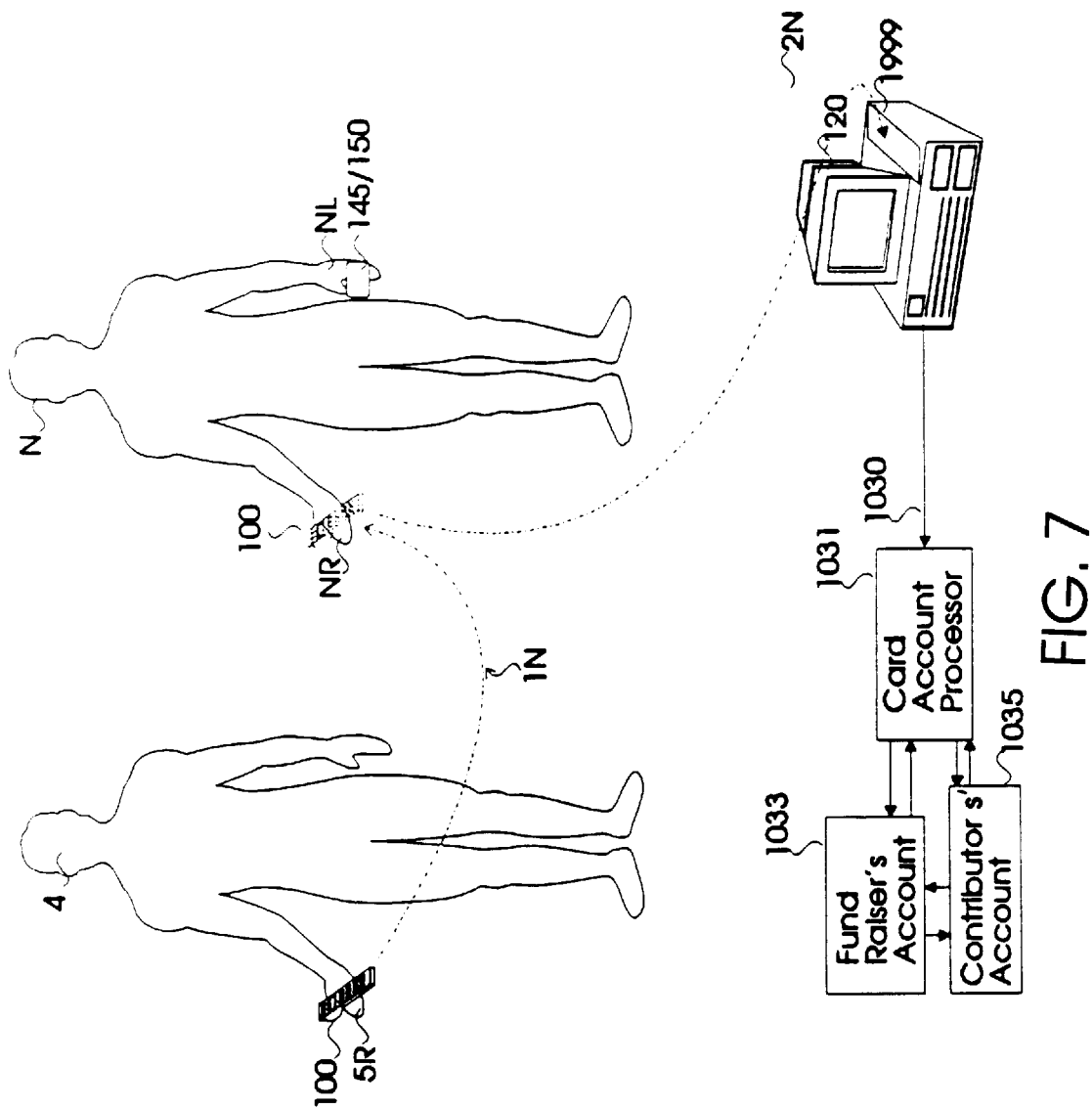
FIG. 7 is an illustration of the excercise of a method of the present invention with a variant of the electronic device of the present invention.

FIG. 7 illustrates a variant of the method. The method simplifies the way a contribution is given and induces the giving of a contribution. Terminal 100 is provided for receiving and immediately recording the contribution. The contribution consists of card information from an information bearing card 145/150. As described above, information bearing card 145/150 is a credit card 145, debit card 150, or combination thereof.

A contributor N is provided for making of a monetary contribution with a portable terminal 100 for making of record data of a contribution by an agent 4 of a donation kettle electronic contributions management organization. As used herein, the term agent refers to a volunteer, employee, principle or any individual acting on behalf of a donation kettle electronic contributions management organization of a cause. The contribution is made by contributor N by way of information bearing card 145/150. Preferably terminal 100 has its own source of electric power 1437 and a plurality of optional entry keys manually operable for entering the amount of the monetary contribution to be given. In a preferred embodiment, terminal 100 has a case dimensioned for being held in the palm of contributor N's hand NR. Terminal 100 has a reader 307 disposed on terminal 100 for reading a record medium, e.g. an information bearing card. The record medium has indicia thereon identifying a contributor N making a given monetary contribution. The terminal has optional means for making a visual display 840 of the amount entered by manual operation of entry keys. Terminal 100 also has means for recording the amount of the contribution, e.g. data storage 302, including means for storing the amount of the contribution correlated to the indicia read on the record medium, e.g. information bearing card, of the corresponding contributor N. The correlated amount and indicia read by reader 307 are for eventual off-loading from terminal 100.

Contributor N is provided terminal 100 or agent 4 holds the terminal in hand 5R. By way of further example, contributor N holds terminal 100 in hand NR. Contributor N enters card information by way of card reader 307 disposed on terminal 100 or agent 4 enters the contributor's card information. The contributor N, or agent 4, takes contributor N's information bearing card, e.g. a credit card 145, debit card 150, or combination thereof, with hand NL or the agent's hand, and passes it through card reader 307 disposed on terminal 100. Reader 307 reads information on contributor N's information bearing card and stores it in a data storage. Contributor N or agent 4 then uses his hand NL or the agent's hand and enters a contribution amount, a designation for a particular cause the contribution is for, or combination thereof. By way of further example, contributor N or agent 4 may press a single key disposed on terminal 100, e.g. a $5 key, to enter a contribution amount. Optionally, contributor N or agent 4 may press a combination of keys on a keyboard disposed on terminal 100 to designate a contribution amount, e.g. $35.71. Contributor N's contribution amount and respective card information are correlated, and stored in a data storage on terminal 100. Contributor N or agent 4 may enter card information with a single information bearing card or with multiple information bearing cards.

Figure 8:
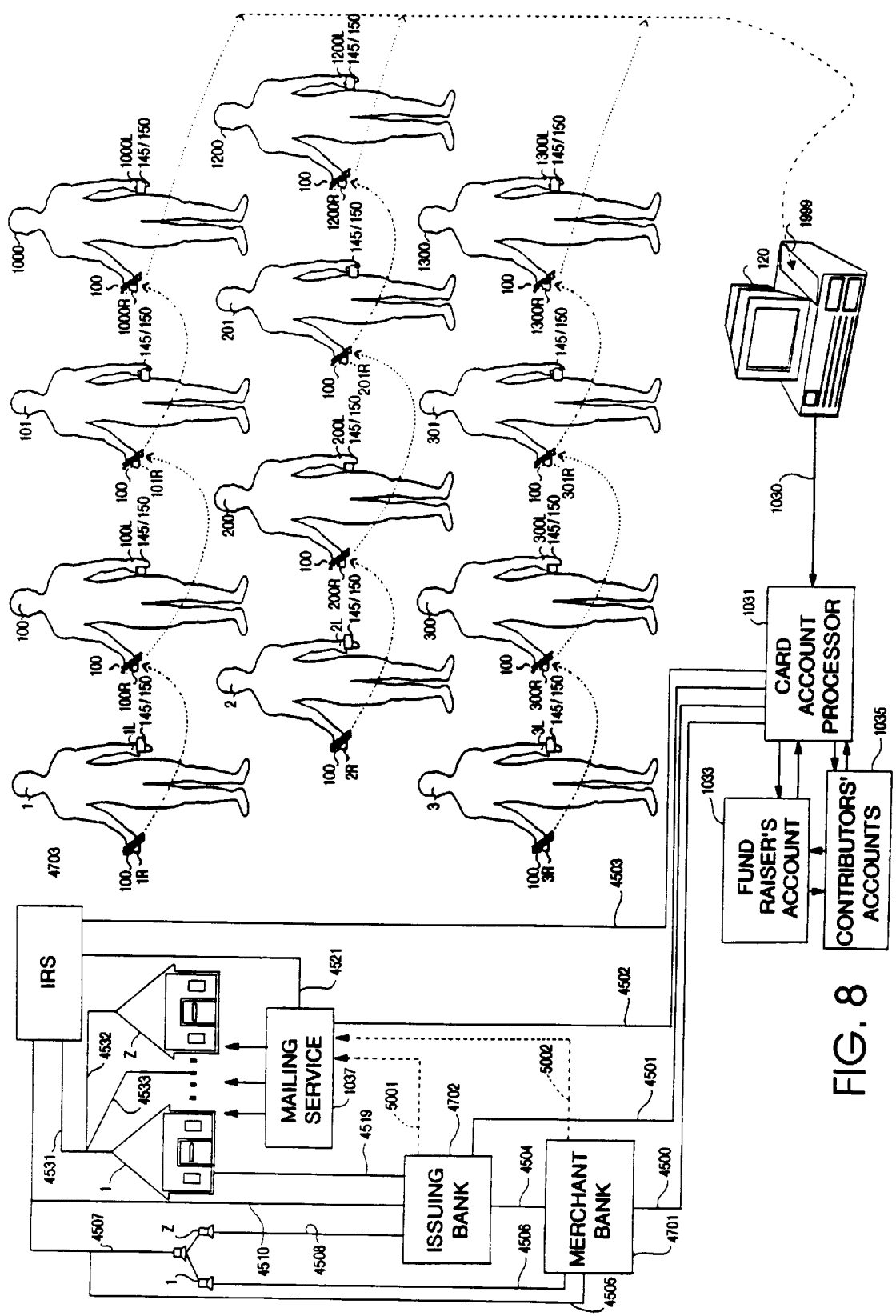
FIG. 8 is an illustration of a routing scheme of the present invention.

FIG. 8 is a diagram of a method of substantiating a contribution. The method also is used for substantiating a charitable contribution deduction. The contribution is made by way of an information bearing card.

A contributor making a monetary contribution is provided with a portable terminal 100, or other electronic device described herein, for making of record information of the contribution transaction. The contribution transaction comprising card information from a respective contributor's information bearing card, contribution amount information, a designation of a particular cause for which the contribution is made, contribution routing information, a designation of the tax deductibility of a particular contribution transaction, or a combination thereof. In one embodiment, terminal 100 has its own source of electric power and a plurality of entry keys manually operable for entering the amount of the contribution to be given, a designation of a particular cause for which the contribution is to be made, or combination thereof. In an alternate embodiment, terminal 100 has the features described above. A reader 307 on terminal 100 reads information from a respective contributor's information bearing card having indicia thereon identifying the contributor giving the monetary contribution. Terminal 100 has optional means for making a visual display of the amount entered by manual operation of entry keys, and the terminal having means for recording the amount of the contribution including means for storing the amount correlated to the indicia read on the information bearing card of the corresponding contributor, correlated to a contributor's designation of a cause, or correlated to a combination thereof. The contribution data is retrieved from terminal 100, and downloaded to donation kettle electronic contributions management terminal 120, card account processor 1031, a bank 1043, a funds processing network, e.g. VISA Net, or a combination thereof.

Processing of the retrieved data of the contribution transaction occurs as described above. Processing includes by way of example, associating an address, e.g. a postal address, electronic mail address, e.g. e-mail address, with a contributor, and/or preparing a record of the contribution transaction. The record of the contribution transaction is forwarded to said contributor. The record may be a hard copy print out of the transaction forwarded to a mailing service 1037. The mailing service 1037 then forwards the record of the transaction to the contributor.

By way of example, contributor N makes a contributions and gifts transaction as described above on terminal 100. Terminal 100 downloads or off-loads the contribution transaction data to terminal 120 via docking station 1999 and communication link 140, card account processor 1031 via communication link 1030, a bank, a network, or combination thereof. The contribution transaction data is processed. Processing includes routing funds from and to appropriate accounts 1033, 1035, debiting and crediting respective accounts, and preparing records of these transactions. Processing can also include grouping a contribution transaction with other contribution transactions that qualify for a charitable contribution deduction for a single cardholder that is a contributor, or a plurality of cardholders that are contributors. Processing also can include grouping contribution transactions made by a single contributor to a particular donation kettle electronic contributions management organization, e.g. a church, the American Red Cross, or particular type of donation kettle electronic contributions management organization, e.g. health related donation kettle electronic contributions management organizations, arts related donation kettle electronic contributions management organizations, etc. Processing can also include grouping contribution transactions.

By way of example, assume, contributor$_1$ makes contribution transactions 1 through 100 during a specified time period, e.g. one week, one month, one year, one taxable time period. Contribution transactions 1 through 100 are grouped into authorized and unauthorized transactions. Assume contribution transactions 95 through 100 are unauthorized, and contribution transactions 1 through 94 are authorized. Contribution transactions 1 through 94 are grouped into contribution transactions that qualify for a charitable contribution deduction and those that do not qualify for a charitable contribution deduction. Assume that contribution transactions 1 through 50 qualify for a charitable contribution deduction and that contribution transactions 51 through 94 do not qualify for a charitable contribution deduction. Contribution transactions 1 through 50 are then be forwarded to a contributor, e.g. by mailing a record of the contribution transactions or electronically forwarding signals representative of the contribution transactions to a contributor, tax processing body, e.g. the IRS, a donation kettle electronic contributions management organization, e.g. a church, or a combination thereof. It will be understood that signals representative of contribution transactions 1 to 100, signals representative of an accounting report, or a combination thereof, are sent to a donation kettle electronic contributions management organization from a card account processor, settling bank, issuing bank, merchant bank, or a combination thereof, via a communication link. The process is repeated for contributor$_1$ through contributor$_N$. It will be understood that a large number of contribution transactions can be substantiated and accorded the status of a charitable contribution deduction, and a substantial amount of transaction costs saved which would have to expended for substantiating charitable contributions and gifts made by card holders to donation kettle electronic contributions management organizations by employing terminal 100 and methods referred to herein.

A record of a contribution transaction or a group of transactions is routed to a mailing service 1037, e.g. the U.S. Post Office, a private mail courier, or the like. The mailing service 1037 delivers the record of the contribution transaction to a mailing address of contributor 1039. The record of the contribution is used by the contributor to substantiate the contribution made to the donation kettle electronic contributions management organization. Substantiation may be made to a national, state, or local taxing body, e.g. the Internal Revenue Service. It will be understood that the transaction costs associated with providing substantiation for charitable contribution deductions, and the like, for a plurality of cardholders who are contributors will be reduced by utilization of the above method.

In an alternate method, the method comprises the step of forwarding a record of the contribution transaction to contributor N by electronically mailing, e.g. e-mailing, a record of the contribution transaction to contributor N using a communication link, e.g. phone lines. By way of example, a periodic statement regarding contributions and gifts is sent to a contributor via a network of computers, e.g. Prodigy, America On line, and the like, to a contributor's home computer terminal via a communication link, e.g. a telephone hook up.

The record of the contribution transaction is forwarded by a bank 1043, a card account processor 1031, by way of example, Card establishment Services of Melville, N.Y., or VISA Merchant Bank Services of San Mateo Calif., a donation kettle electronic contributions management organization, an issuing bank, a processing bank, a merchant bank, or combination thereof to contributor N.

In yet another embodiment of the method, a record of the contribution transaction, or a plurality of contribution transactions made by a contributor, are electronically forwarded, mailed, or combination thereof, to a governmental tax processing body, e.g. the Internal Revenue Service. It will be appreciated that the method disclosed herein has a number of benefits, including the reduction of the work and resources associated with preparing tax returns and claiming charitable contribution deductions, reducing the amount of fraud associated with claiming charitable contribution deductions, reducing the amount of work a governmental tax processing authority has to do when processing charitable contribution deductions.

The method provided above can also include the step of associating with charitable contribution data with a tax identification number of a contributor, e.g. a social security number of a contributor and the like, a tax return for a contributor, or a combination thereof. It will be appreciated that the association of the tax identification number associated with a contributor, a tax return of a contributor, and a contribution transaction or plurality of contribution transactions for a contributor, and the direct forwarding of the contribution transaction information to a tax processing governmental body will greatly simplify the processing of charitable contribution deductions and the like.

The present invention further contemplates forwarding a record of contribution transactions to a donation kettle electronic contributions management organization, a contributor, or to a contributor on behalf of a donation kettle electronic contributions management organization from a card account processor 1031, a bank, or combination thereof. As will be appreciated utilization of this method provides the benefits of decreased paper work for donation kettle electronic contributions management organizations involved with substantiating contributions and gifts made by contributors.

The method further optionally includes the step of providing a contemporaneous, or subsequent, written acknowledgment or record of the contribution by the donation kettle electronic contributions management organization. The acknowledgement or record substantiating a contribution includes the following information, or combination thereof:

(1) The amount of cash or equivalent card information and numerical contribution amount contributed;

(2) Whether the donation kettle electronic contributions management organization provided any goods or services in consideration, in whole or in part, in exchange for the cash contributed; and, (3) A description and good faith estimate of the value of any goods or services referred to in (2) above of, if such goods or services consist solely of intangible religious benefits a statement to that effect.

The term intangible religious benefit refers to any intangible religious benefit which is provided by an organization organized exclusively for religious purposes and which generally is not sold in a commercial transaction outside the donative context. An acknowledgement is considered contemporaneous if the contributor taxpayer obtains the acknowledgement on or before the earlier of (1) the date on which a taxpayer files a return for the taxable year in which the contribution is made, or the due date (including extensions) for filing such a return. By way of example, such substantiation is provided by portable hand-held terminal 100, donation kettle electronic contributions management terminal 120, a printer, a portable hand-held terminal 100, wherein portable hand-held terminal 100 has its own source of electrical power and an integral printer, a card account processor 1030, a bank, a donation kettle electronic contributions management organization, or combination thereof. The acknowledgment is a periodic statement reflecting information bearing card account balances and the like, in one embodiment.

In yet another embodiment of the method, such substantiation is provided by a standard information bearing card 145/150, donation kettle electronic contributions management terminal 100, a printer, a card account processor 1030, a bank, a donation kettle electronic contributions management organization, or combination thereof.

The method also includes the optional step of a donation kettle electronic terminal 100 or a card account processor 1031 providing substantiation of a contribution to a tax processing governmental body, e.g. the Internal Revenue Service, on a hard copy of a tax return or electronically. The substantiation and record thereof, includes, by way of example, (1) The amount of cash, card information and numerical contribution amount contributed by a respective contributor, or a group of contributors;

(2) Whether the donation kettle electronic contributions management organization provided any goods or services in consideration, in whole or in part, in exchange for the cash contributed; and, (3) A description and good faith estimate of the value of any goods or services referred to in (2) above of, if such goods or services consist solely of intangible religious benefits a statement to that effect.

Terminal 100, terminal 120, card account processor 1030, a bank, a donation kettle electronic contributions management organization, or combination thereof, optionally associate to a contribution transaction, e.g. including card information and numerical contribution amount information for a single contributor or a plurality of contributors, a designation regarding the tax deductibility status of the contribution transaction. By way of example, the status may include whether or not the contribution is or is not tax deductible, or whether the organization to which the contribution is made falls under a certain category of taxable organization, or combination thereof.

FIG. 8 also illustrates communication links that are used in a system and methods of the invention. Communication links (analogous to links 140, 1030) are used to transmit a single or a group of contribution transaction information units, e.g. correlated cardholder and contribution amount information; correlated cardholder, contribution amount, and tax deductibility status of a particular contribution amount; correlated cardholder, contribution amount, and cause information; an electronic record of contribution transactions made at a single contribution session or a group of contribution sessions for a single contributor or group of contributors; charitable contribution deduction substantiation paper records and electronic records; electronic records for substantiating contribution transactions made at a single contribution session or a group of contribution sessions for a single contributor or group of contributors; or combination thereof. These information units are transmitted to a merchant bank 4701; an issuing bank 4702; home computers 1' through Z' of respective contributors; homes or mailing addresses 1' to Z' of respective contributors (where Z' is an integer); mailing service 1037; the Internal Revenue Service 4703 (or other taxing processing entity) or a combination thereof.

For example, card account processor 1031 transmits information representative of the information units, electronic records, other information referred to above, or a combination thereof, to merchant bank 4701 via communication link 4500, e.g. a telephone link or dedicated line, to issuing bank 4702 via communication link 4501, to a mailing service 1037 via communication link 4502. Issuing bank 4702 has a communication link 4504 with merchant bank 4701. Merchant bank 4701 has a communication link 4505 with the Internal Revenue service 4703. Merchant bank 4701 has a communication link 4506 with the networked home computers of 1' through Z' of respective contributors. Home computers of 1' through Z' of respective contributors have a communication link 4507 with the tax processing body 4703. Issuing bank 4702 has a communication link 4510 with the Internal Revenue Service 4703. Issuing bank 4702 has a communication link 4508 with the networked home computers of 1' through Z' of respective contributors. Merchant bank 4701, issuing bank 4702, card account processor 1031, or a combination thereof, routes records of correlated contribution transactions and charitable contribution deduction substantiations and other paper or electronic records in a variant to mailing service via routes 5002, and 5001 respectively. Mailing service 1037 then distributes the records to each respective contributor's home 1' through Z' as indicated by the arrows in FIG. 8. Issuing bank 4702, merchant bank 4701, or a combination thereof, also has a communication link 4519 to respective contributors homes 1' through Z'. Mailing service has communication link 4521 with IRS 4703. Links 4531, 4532, 4533 represent communication links with the respective contributors' homes and the IRS 4703. It will be understood that the various communication links illustrated are used in the methods and systems described herein and facilitate, simplify, and lower transaction costs for the substantiation of charitable contribution deductions given by a multiplicity of cardholder contributors on a multiplicity of terminals 100.

Figure 9:
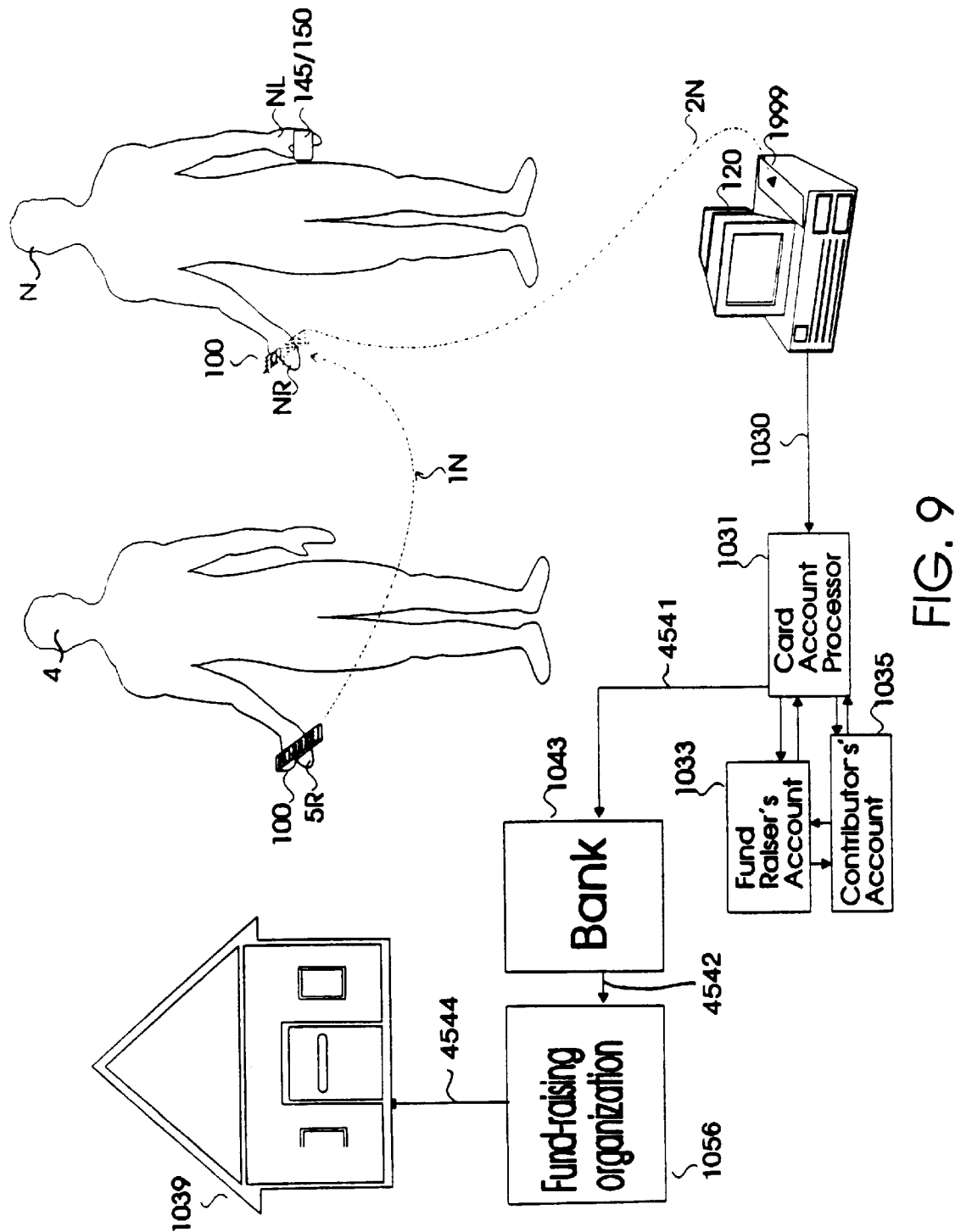
FIG. 9 is an illustration of a variant of a routing scheme of the present invention.

FIG. 9 illustrates the flow of correlated contribution transaction information made on terminal 100, or the other electronic devices, as described herein. Terminal 100 transmits a multiplicity of contribution transaction information to terminal 120 when terminal 100 is communicative linked to docking station 1999 via link 2N after a contribution session with a plurality of contributors. Terminal 120 transmits the correlated information via link 1030 to a card account processor 1031. Card account processor 1031 processes the information. Card account processor 1031 transmits the correlated and processed information to bank 1043 via communication link 4541. Bank 1043 transmits the correlated and processed information via link 4542 to donation kettle electronic contributions management, and then to organization 1056. Donation kettle electronic contributions management terminal 100 or the organization then transmits the correlated and processed information by route 4544 to a mailing address 1039 of a respective contributor.

Another variant of the method of simplifying and inducing the giving of monetary contributions and gifts by contributors (Contributors, include individuals) as described above is also provided and illustrates a method or routing and system for routing contribution transactions correlated with different donation kettle electronic contributions management organizations or different accounts of donation kettle electronic contributions management organizations. The method includes receiving and immediately recording a multiplicity of contributions and gifts made by use of an information bearing card on terminal 100.

The method consists of providing the contributors making monetary contributions and gifts with a portable, hand-held terminal 100 for making of record data of the contribution transaction. In one embodiment, terminal 100 has its own source of electric power and a plurality of entry keys manually operable for entering the amount of the contribution to be given. Terminal 100 has a face as described in FIGS. 10–12, or variant thereof. In another embodiment, terminal 100 is an information bearing card terminal or peripheral. A card reader 307 is disposed on terminal 100 for reading an information bearing card having indicia thereon identifying the contributor making the monetary contribution. Terminal 100 has optional means for making a visual display of the monetary contribution amount entered by manual operation of entry keys. Terminal 100 has means for recording the amount of the contribution including means for storing the amount correlated to the indicia read on the information bearing card of the corresponding contributor. The correlated amount and indicia read by the card reader from the information bearing card are for eventual off-loading from terminal 100 as described above. Off-loading, e.g. downloading, of the associated cause information, respective contribution amount information, and card information from a respective contributor, is to a donation kettle electronic contributions management terminal 120, fund processing network, e.g. VISA Net, a bank, or a combination thereof, via communication links 140, 1030, 1033, or combination thereof. The card account processor 1031, fund processing network, e.g. VISA Net, a bank, or combination thereof, route the associated card information, contributor information, and account designation to an account of a single donation kettle electronic contributions management organization, to a plurality of accounts of a single donation kettle electronic contributions management organization associated with the cause for which the contributor designation was made, or a combination thereof.

For example, a first key represents a first cause, a second key represents a second cause, and a third key represents a third cause. A first contribution transaction is correlated with information representative of first cause. A second contribution transaction is correlated with information representative of second cause. A third contribution transaction is correlated with information representative of third cause. The correlated information is transmitted to terminal 120 via link 140, then to card account processor 1031. In a variant correlated contribution transactions are transmitted to card account processor 1031 via link 1033.

The method and system includes routing the respective contributions and gifts to respective causes to each respective account of each respective cause. The information of the first correlated contribution transaction is routed to account 8921 via a communication link. The information of the second correlated contribution transaction is routed to an account via communication link. The information of the third correlated contribution transaction is routed to another account via communication link.

As will be understood contribution transaction information can be routed to a plurality accounts, that include by way of example, a plurality of accounts within a single donation kettle electronic contributions management organization, accounts for a plurality of donation kettle electronic contributions management organizations, accounts for a plurality of causes, or combination thereof.

As mentioned above, the use of terminal 100 as it is passed from one contributor to another contributor will increase the risk of terminal 100 being damaged by being accidentally dropped. Optionally, the terminal 100 also comprises a shock-absorbing material surrounding the case of terminal 100 (not pictured). Shock absorbing material can be located around the exterior to terminal 100 to shield terminal 100 from damage in the event the terminal is accidentally dropped. Shock absorbing material can also be used inside terminal 100 to shield circuitry. Alternately the shell of terminal 100 may be constructed of shock absorbing material. Shock absorbing material includes shock absorbing foams, plastics, rubbers, and other material capable of absorbing shock.

A method of generating a contributor list is also provided. A plurality of contributors, e.g. 1, 2,...N, enter card information, associated numerical contribution amounts, or a combination thereof, into terminal 100 as described above. Terminal 100 stores the contribution transaction as described above. The contribution transactions include, information such as the names of each respective contributor, an account number for each respective contributor, and a corresponding numerical contribution monetary amount for each respective contributor. The contribution transaction information is transmitted to a card account processor, a funds transferring network, a bank, or combination thereof for processing. Processing includes associating an address with the contribution transaction or portion thereof. The associated contribution transaction information and address information for each contributor is then grouped together. A hard copy of the grouped information is then printed out, stored onto a computer disk, or forwarded to a donation kettle electronic contributions management organization via a communication link to a database. It will be appreciated that a list prepared by the method described above can be used by a donation kettle electronic contributions management organization for the subsequent solicitation of contributors. In a variant, the information is entered on terminal 100 subsequent to the contribution transaction.

The method described above may also include an authorization step whereby a contribute approves the provision of his address and other personal information for entry on a list, e.g. income information, age information, and other data which can be used for market research. The method described above may also include a step of associating the contributor's card information, contribution information, or combination thereof, with other market research data, e.g. age of contributor, income level of contributor, and other normally obtained market research data. In this scenario terminal 100 may be a portable hand-held terminal as described.

The present invention provides a method of increasing the giving of contributions and gifts, a method of increasing the average size of a contribution given by an contributor, a method of increasing the average contribution given by an individual over a period of time, a method of increasing the contribution revenue of a donation kettle electronic contributions management organization, a method of increasing the average contribution revenue of a donation kettle electronic contributions management organization, a method of increasing the average giving of a contributor to a single donation kettle electronic contributions management organization, of a plurality of donation kettle electronic contributions management organizations. The methods described above include a contribution wherein the contribution is a donation kettle electronic contributions management organization contribution, a political contribution, a religious organization contribution, a charitable contribution. The method steps are those as disclosed above.

The invention provides a method of minimizing the liability risk for a card account processor, and donation kettle electronic contributions management organization associated with utilization of an off-line information bearing card terminal. The method includes the step of accepting an off-line information bearing card transaction. The transaction includes accepting a contribution made by use of information bearing card and a numerical contribution amount made to a donation kettle electronic contributions management organization. The donation kettle electronic contributions management organization is as described above and includes, by way of example, a charitable organization, a museum, a religious organization. The contribution transaction made by a contributor can result in an intangible psychological benefit to the contributor. The psychological benefit may be a religious benefit, a humanitarian benefit, and the like, e.g. the contributor feels that he is "doing a good" for society, humanity, another human being, the environment, and the like.

A method of decreasing the average number of chargebacks associated with a group of transactions is also provided. The transactions are made on an off-line terminal 100 that accepts transactions by use of information bearing card. The method includes the steps of gathering a plurality of contribution transactions into a batch through the use of an off-line information bearing card terminal. The contribution transaction comprising information from an information bearing card for a respective contributor and designated contribution amount information for a respective contributor. The contribution data are transmitted in batch for authorization to a card account processor. Unauthorized transactions are discarded and authorized transactions are settled or reconciled.

The present invention also provides a system for fund raising, increasing donation kettle electronic contributions management revenue, or combination thereof. The system comprises a portable off-line donation kettle electronic contributions management terminal 100 that allows a plurality of contributors to make contributions and gifts sequentially by use of each cardholder contributor's information bearing card. Terminal 100 is as described above.

The system includes an optional fund raiser's terminal 120 for accepting each respective contributor's correlated card information, numerical amount information, cause designation information, designation of tax deductibility of contribution, or combination thereof. Terminal 120 post processes this information.

The system includes an optional communication link for downloading correlated card information for a respective contributor, numerical amount information for a respective contributor, cause designation information, or combination thereof, to a donation kettle electronic contributions management terminal.

The system also includes optional card processing services for routing card transaction information, and a an account product for storing post processed contributions and gifts. The account product includes, e.g. a bank account. The system also includes the methods disclosed herein.

FIG. 13 illustrates a method of maximizing the contribution potential of a group through the use of a terminal 100 and, a plurality of terminals 100 is applied.

A group of people gathered has a contribution potential denoted by the function "C(p)" (FIG. 13). Typical groups that are gathered include contributors gathered at at retailers, in front of shopping centers, in centers of transprotation such as train stations, bus terminals, airports, religious services, political donation kettle electronic contributions management events, rallies, conferences, conventions, movies, sporting events, offices, dinners, weddings, and the like. A contribution session includes an amount of time allocated for the gathering of contributions and gifts with a group of prospective contributors. A contribution potential, C(p), is a function that symbolizes the amount of contributions and gifts that can theoretically be gathered from a group of prospective contributors, e.g. a first prospective contributor, "contributor$_1$" to an nth prospective contributor, "contributor$_n$."

The group of prospective contributors consists of a first contributor, "contributor$_1$" to an nth contributor, "contributor$_n$." Group comprises sub-groups of contributors, e.g. sub-groups 4001–4004 (not shown). Sub-group 4001 comprises "contributor$_1$" through contributor$_7$. Sub-group 4002 comprises "contributor$_8$" through contributor$_{14}$. Sub-group 4003 comprises "contributor$_j$" through contributor$_{j-6}$ where j is an integer and ($21<j<(n-6)$). Sub-group 4004 comprises "contributor$_n$" through contributor$_{n-7}$ where n is an integer. Generally, "n" is an interger with a large absolute value. Even though sub-groups 4001, 4002, 4003, and 4004 consist of seven contributors it is understood that these subgroups can consist of any number of contributors, e.g. ten contributors, twenty contributors, fifty contributors, including a multiplicity of contributors, and that the number of contributors in each sub-group need not be equal, e.g. sub-group 4001 may comprises fifty contributors, and sub-group 4002 may comprise one-hundred contributors. Moreover, it will be understood that there may be a multiplicity of sub-groups within group, e.g. 100 sub-groups of fifty contributors per sub-group.

In mathematical terms as illustrated in FIG. 13, C(p) is proportional to $I_i$ 4062, C(p) is proportional to $M_i$ 4064, C(p) is proportional to $P_i$ 4066, C(p) is proportional to $G_i$ 4068, C(p) is proportional to $C_i$ 4070, C(p) is proportional to $N_i$ 4072, C(p) is proportional to $X_i$ 4074, and C(p) is proportional to $A_i$ 4076. As is understood, $C(p)=(k_1)(I_i)$, $C(p)=(k_2)(M_i)$, $C(p)=(k_3)(P_i)$, $C(p)=(k_4)(G_i)$, $C(p)=(k_5)(C_i)$, $C(p)=(k_6)(N_i)$, $C(p)=(k_7)(X_i)$, and $C(p)=(k_8)(A_i)$. In these examples, $1<i<n$.

C(p) is also proportional to the sum from i=1 to i=n of the product of the function $[I_i*M_i*P_i*C_i*N_i*X_i*A_i]$ 4078. As is understood, C(p)=the sum from i=1 to i=n of the product of the function $(k_9)([I_i*M_i*P_i*G_i*C_i*N_i*X_i*A_i])$.

As is understood, the contribution potential, C(p), of a group (FIGS. 17 and 17e) of contributors or a sub-group of contributors, e.g. sub-groups 4001, 4002, 4003, and 4004 is a function of a variety of different variables. The variable $I_i$ for a respective contributor is a function of the importance a cause or objective has to a specific contributor. By way of example, an "i"th contributor may place a high level of importance or utility to contributions and gifts that are made to allow an individual to obtain an organ transplant, and a lower level of importance or utility on contributions and gifts made to an organization that has as its goal the creation of a habitat to save an endangered species. It will be understood that a method of the present invention for maximizing the C(p) of a contributor, e.g. $C_i$; sub-groups 4001–4004 of contributors; or a group of contributors involves analyzing I for the respective unit by calculating the historical affinity of the unit for the cause being contributed to. This calculation is accomplished by utilizing known statistical techniques, and may be calculated from data collected on terminal 100.

The variable $M_i$ is a function of the ease of making a contribution at the time and place where the contribution is solicited. $M_i$ is a function of, and is proportional to, the speed with which a contribution transaction or session can be consummated in the field denoted by $S_i$, and a convenience variable denoted by $Q_i$. $M_i$ can be increased in size by providing group or sub-groups 4001, 4002, 4003, 4004 of contributors a terminal 100 or a plurality of terminals 100. A plurality of terminals 100 are circulated among the contributors. The terminals 100 operate as disclosed above and do not interpose a request for authorization between sequential contribution transactions. In one variant, a contributor $C_{j-1}$ engages in a two step contribution entry process that consists of entering his card information, and entering his contribution amount information. Optionally, a contributor $C_{j-1}$ confirms his contribution amount information. In a variant, $C_{j-1}$ engages in a one step contribution process in the field whereby the contributor simply enters his card information, e.g. slides his information bearing credit or debit card, through a slot or a port on terminal 100. The card information for a respective contributor is associated with a pre-programmed contribution amount. As an example, the respective contributor's card information is associated at terminal 100, terminal 120, a card account processor 1031, or a combination thereof. It will be understood that the use or this feature will allow the speed of the consummation of a contribution transaction in the field to be greatly accelerated. In a variant, terminal 100 does not present to the prospective contributors in the group a display or a keyboard or other forms of manually entry and presentation of the contribution amount. Rather terminal 100 has thereon a card reader. This version of terminal 100 is optionally supplemented with indicia identifying the fund-raiser to which the contribution is being made, indicia identifying the preferred orientation of a card that is to pass through the card reader, a means for visually, e.g. a flashing light, or an audio means for indicating the successful entry of card information on terminal 100. For example, after each respective contributor enters his or her card information on terminal 100. Circuitry in combination with a speaker projects a message "Thank you for your contribution of $25," "Your contribution has allowed us to feed fifteen hungry children in Africa," etc.

Immediately thereafter, the terminal 100 is presented to a subsequent contributor $C_j$ for entry of like information.

By way of further example, a first terminal 100 is circulated among the contributors 1 through 7 in sub-group 4001. The first terminal 100 is then circulated among the contributors 8 through 14 in sub-group 4002, and then circulated among the contributors j–6 through j, and n–6 through n in sub-groups 4003, 4004, respectively. It is understood that not imposing a request for authorization between sequential contribution transactions accelerates the time within which the first terminal 100 reaches contributors further down stream, e.g. contributor j–6 through contributor j. This allows the down stream contributors to make contribution transactions closer to the point in time of maximum stimulus for evoking an impulse to make a contribution, $t_{max}$ 4085, and thereby enhances the amount of individual contributions and gifts by these down stream contributors, and also the number of contributions and gifts made by these down stream contributors since their incitement to action has not had a chance to dissipate.

In a variant, a first terminal 100 is circulated among the contributors 1 through 7 in sub-group 4001, a second terminal 100 is circulated among the contributors 8 through 14 in sub-group 4002, a third terminal 100 is circulated among the contributors j–6 through j in sub-group 4003, and a fourth terminal 100 is circulated among the contributors n–6 through n in sub-group 4004. It will be understood that this method will allow contributors in the various sub-groups to make contribution transactions closer to the point in time of maximum stimulus for evoking a stimulus for making a contribution, $t_{max}$ 4085. That is, the presentation of a plurality of terminals will allow contributor 1 to make his contribution transaction at about the same delta t from the point of maximum stimulus, $t_{max}$ 4085, as contributor 8 in sub-group 4002, as contributor j in sub-group 4004, and as contributor n in sub-group 4003. The individual amounts of contributions and gifts made by these contributors is enhanced since their incitement to action has not had a chance to dissipate. It is understood that this method accelerates the time within which the terminals 100 reach individual contributors within sub-groups 4001–4004 thereby allowing contribution transactions to be made prior to any significant dissipation of stimulus, motivation to action, or incitement to action.

Due to the increase of the availability and ease of use of debit card terminals ("cash station" machines) and the increase in the availability and acceptance of credit cards over time, contributors in group are less likely to have with them cash or a check book on hand. Concurrent, with this trend is the increased likelihood that a contributor in group will carry a credit card and/or a debit card (a single card or a plurality of cards) on his or her person. The provision of terminal 100 or a plurality of terminals 100 to the contributors in group increases the convenience variable $Q_i$, and also $S_i$ since the contributors need not waste time searching for a preferred amount of a cash contribution or a check book on their person or waste time filling out a check, in their wallets, or in their purse at the point a contribution is solicited. Searching for cash and filing out a check to make a contribution at the point a contribution is solicited is an event decreases convenience and also $M_i$. Rather, the contributors in group take their bank cards and simply swipe them across the card readers 307 on the terminals 100. Consequently, the convenience variable is increased, $Q_i$. Since the convenience variable, $Q_i$, is proportional to $M_i$, $M_i$ is increased. Moreover, going over to a cash station machine, or over to a terminal at a table increases the inconvenience associated with making a contribution, e.g. waiting in line and/or searching for the location of the terminal, thereby decreasing the value of $Q_i$, and $M_i$. Providing the portable hand-held, terminals 100 directly to contributors so that they may personally enter their contribution information in group, or the respective sub-groups 4001, 4002, 4003, and 4004 increases the value of $Q_i$, and $M_i$ by making the contribution transaction more convenient for the contributors within the group or sub-groups. The ability to personally enter a contribution transaction where to contributor need not give his information bearing card to an intermediary to enter a card transaction as with known card terminal increases $Q_i$, $S_i$, and consequently $M_i$.

$M_i$ is a function of the speed with which a contribution transaction may be consummated. The shorter the length of time within which it takes to consummate a contribution transaction by a respective contributor within group or sub-groups 4001, 4002, 4003, 4004, with terminal 100, the larger the $M_i$ variable. Hence, $M_i$ is inversely proportional to the speed within which a contribution transaction can be consummated at the time it is solicited. As is understood C(p) will be increased for group, or the respective sub-groups 4001–4004 if the amount of time that it takes for the respective contributors in the group to consummate their respective contribution transactions in the field can be decreased.

Moreover it is understood that not interposing a request for authorization in the feild where terminal 100s are used (e.g. decoupling the request for authorization from each respective contribution transaction in the field where the contribution transactions are entered onto terminal 100) allows a larger number of prospective contributors to be presented with terminal(s) 100 within a fixed amount of time.

By way of example, the length of time it takes for contributors in group to make their respective contribution transactions is decreased if there is no request for authorization interrupting sequentially made contribution transactions. Preferably, there is no request for authorization interrupting sequentially made contribution transactions at the time and location where the sequential contribution transactions are being entered by prospective contributors, e.g in the field during a contribution session.

By way of further example, assume a request for authorization and answer to the request takes 15 seconds for each sequential contribution transaction entered, and assume that the sub-group of prospective contributors consists of 100 prosective contributors and that each respective contributor will make a contribution on terminal 100. Interposing a request for an authorization and obtaining an answer lengthens the time needed to enter and process contribution transactions in the feild from the sub-group of 100 an additional 1500 seconds, or 25 minutes of additional time. Adding the 1500 seconds of additional time to enter and process the contribution transactions in the feild would make the length of time the contribution session would last unworkable. In a church the average amount of time allocate for the gathering of contributions and gifts is one to five minutes depending on the size of the congregation (of course, it is a longer period of time the larger the congregation) that the sub-group of prospective contributors consists of 1000 prosective contributors and that each respective contributor will make a contribution on terminal 100. Interposing a request for an authorization and obtaining an answer lengthens the time needed to enter and process contribution transactions in the feild from the sub-group of 1000 an additional 15,000 seconds, or 250 minutes of additional time. Adding the 15,000 seconds of additional time to enter and process the contribution transactions in the feild would make the length of time the contribution session would need to last to allow for entry of all contribution transactions unfathomable.

As the terminal is passed from the contributor$_{j-1}$ to the contributor$_j$, the contributor$_j$ does not wait for a request for authorization to be transmitted from terminal 100 and answered in the feild for the contributor's$_{j-1}$ contribution transaction before the contributor$_j$ enters his contribution transaction on the terminal 100. Therefore, the speed of the consummation of the contribution transaction made in the field made by contributor$_j$ is greatly accelerated, and the speed of the consummation of the sequentially made contribution transactions on a first terminal 100 made by the plurality of sequential contributors is greatly accelerated. Consummation of the plurality of contribution transactions utilizing a plurality of terminals 100 within group more greatly reduces the time to consummate the entire group's contribution transactions which are made at a contribution session. As is understood, these factors greatly decrease the time period required to conduct a contribution session, and increase the contribution potential of the group.

Moreover, the speed of a contribution transaction is greatly accelerated through the provision of and use by a contributor of a recommended contribution amount key on terminal 100, e.g. a key with a recommended contribution amount, e.g. $50.00 and $100.00. The recommended contribution amount is of an order that induces the making of the monetary contribution transaction. Preferably, the user interface of terminal 100 consists solely of keys representing recommended contributions and gifts amount of an order that indicues the making of monetary contribution transactions. It is understood that the time a single contribution transaction is consummated in the field is greatly reduced if a contributor need not press several keys sequentially to enter a contribution amount onto terminal 100, e.g. if the contributor need not press a "1," "0," "0," and "0" to enter a contribution amount of ten dollars. Rather the contributor presses a single key representative of a ten dollar contribution. It is futher understood that the time savings of a multiplicity of sequential contributors utilizing this feature will greatly shorten the amount of time needed to complete a contribution session in the field.

The speed of a contribution transaction is also greatly accelerated by a pre-authorization step. A pre-authorization step comprises the designation of a monetary contribution commitment prior to the presentation of terminal 100 or a plurality of terminals 100 to group. By way of example, terminal 100, terminal 120, or a combination thereof, is pre-programmed to correlate a recommended contribution amount, e.g. $25.00, once a respective contributor enters his card information on terminal 100, e.g. slides his respective information bearing card through reader 307 on terminal 100. The pre-authorization is made by an individual respective contributor prior to the solicitation of the contribution in one variant.

In another variant, it will be understood that a fund-raiser can pre-program terminals 100 to correlate a first recommended default contribution amount with a standard information bearing card, e.g. a Citibank Classic credit card, and/or a higher recommended default contribution amount with a premium credit card, e.g. a VISA™ gold card. By way of example, contributors enters his card information that is card indicia representative of a Citibank Classic credit card, e.g. on the magnetic strip of the contributor's card. Terminal 100, terminal 120, card account processor 1031, or a combination thereof, correlate a pre-programmed recommended contribution amount of $10.00 with the card information of contributors.

Contributor$_{j-5}$ enters his card information that is card indicia representative of a premium card, e.g. VISA™ gold credit card. Terminal 100, terminal 120, card account processor 1031, or a combination thereof, correlate a pre-programmed recommended contribution amount that is higher, e.g. $25.00 with the card information of contributory. As is understood a fund-raiser can instruct group that presenting their respective standard cards and premium cards will result in the respective smaller and larger contribution amounts being correlated with the contributors' respective standard and premium cards, and that the correlated information will be later processed. In this variant, it will be further understood that keys and a display on terminal 100 are optional.

As is described, in a variant below, terminal 100 only has a shell dimensioned to fit into a palm or hand of a contributor, its own source of power, means for storing sequentially entered card information, means for associating sequentially entered card information with a pre-programmed contribution amount, and means for off-loading off-line sequentially entered card information correlated with the pre-programed contribution amount. Optionally, in this variant, terminal 100 has an indicator, e.g. a visual indicator or an audio indicator to indicate that a respective contributors' card information was successfully entered thereon.

This pre-authorization feature may also be indicia representative of a preferred contribution amoung for a respective contributor disposed on a respective contributor's information bearing card 145, 150 that the card reader 307 automatically reads once a respective contributor's information bearing card is presented thereto, e.g. a magnetic code on a magnetic stripe card. By way of further example, in the case of IC information bearing cards a contributor may pre-program a preferred contribution amount so that when his card is presented to a card reader on terminal 100 for reading, the preferred contribution amount is automatically read by the card reader 307, correlated, and processed accordingly.

All of these factors reduce the length of time needed to make a contribution transaction at the point in time and space of the solicitation of the contribution transaction and the cumulative length of a contribution session for the group. These practices increase $M_i$ which in turn increases the contribution potential of a group resulting in larger overall contributions and gifts made by group. Moreover, if the contributors in group are required to stand in a line at a remote terminal to make a contribution, e.g. a terminal that is not circulated amount contributors in group, $M_i$ is decreased by increasing the level of anxiety associated with the making a contribution transaction.

The variable $P_i$ is a function of the ability of the fund-raiser to consummate a contribution transaction whether in the field during a contribution session or at some time thereafter. In the scenario where cash is used as a contribution, $P_i$ is 1 since 100% of the contribution transactions are consummated at the time and location where the contribution is solicited. That is, the fund-raiser has cash in hand. In the scenario where pledges are used to collect contributions and gifts, the $M_i$ may be very high since it is very easy to pledge a contribution amount, but $P_i$ is substantially less than 1 since the collection step consummating the contribution transaction is far removed from the point in time and space from the application of external stimulus s (FIG. 17d) evoking an impulse to make a contribution. Moreover, with known methods a large percentage of the contributions and gifts that are pledged does not result in a consummation of the contribution transaction since the financial situation of the contributor changes, the contributor forgets about the pledge altogether, or the impulse that prompted the contributor to make the pledge dissipates and the contributor no longer has a psychological motivation to consummate the contribution transaction. Terminal 100 is used consummate the contribution transaction at the point of maximum stimulus evoking an impulse to make a contribution. Terminal 100's use to solicit contributions and gifts brings the value of $P_i$ very close to 1 since most of the contributions and gifts made are recorded, and will be successfully processed after the contribution session with respective credits and debits being entered on the appropriate accounts of contributors and recipient organizations.

Moreover, the use of a plurality of terminals 100 allows the impulse and the incitement to action arising by the state of mind of the contributor, or the collective state of mind of sub-groups 4001–4004 or group, to be harnessed at the time the impulse or incitement to action is at its maximum level. It will be understood that the impulse to make a contribution dissipates over time.

The contribution potential function, $C(p)$, is also proportional to and a function of an impulse giving function denoted by X. The impulse giving function measures the level of incitement to action to make a contribution that arises from the creation of a state of mind by providing an external stimulus to a contributor or a group of contributors. A state of mind is created by the presentation of an external stimulus or stimuli to an individual prospective contributor, or in a variant, to a group of prospective contributors.

The impulse giving function, $X(s)$ is proportional to a stimulus variable, "s" 4080 (not shown). $X(s)$ is also proportional to time variable, "t" 4082 (not shown). Graph 4084 has a point $t_0$ that indicates the start of an event or the presentation of stimulus evoking an impulse to make a contribution and the start of the presentation of stimulus $s_0$ to a contributor or to a group of contributors. As t progresses forward (time goes forward), a stimulus or stimuli s is provided or presented to the group of contributors as indicated by an increasing value of the variable s.

The stimulus (s) is any external stimulus or stimuli that creates a state of mind conducive to the making of contributions and gifts. By way of example, an external stimulus such as audio stimulus or a visual stimulus is presented to the group. Audio stimulus includes sound recordings, live speeches by candidates, live presentations by missionaries, and the like, that evoke an emotion or impulse conducive of contribution making, e.g. sympathy, anger, love, hate, a need for victory. Multi-media presentations evoking an emotion or impulse to make a contribution are also contemplated herein.

Video stimulus includes audio/visual presentations and "live" presentations of scenes or people such as poverty stricken individuals in need of resources, individuals in need of nutrition, individuals in need of medical care or having a medical condition, and the like. The methods of the invention teach that presentation of strong external stimuli increases the value of the impulse giving function and thus increases the overall value of the contribution potential of the group or individual. The present invention also teaches that the stimulus should be increased and/or maintained at a plateau during the provision or presentation of terminals 100. By way of example, instrumentalities for the presentation of stimulus evoking an impulse to make a contribution include, tape reconrdings, video players, laser disc players, movie projectors, tape players, movie projectors, cable television networks, television sets, projection televisions and the like.

The impulse giving function X will reach a maximum value where $d(s)/d(t)=0$ during the event or during the solicitation of a contribution from an individual contributor and then decay time. Hence, the more remote in time we get from the maximum value of the external stimulus at $t_{max}$, the lower the value of the impulse giving function becomes, and the lower the contribution potential and the impulse to contribute. The impulse giving potential of a group (and the contribution potential which is a function of the impulse giving potential of members of a group) decays and dissipates over time as we move further away from $t_{max}$. The present invention teaches that where $d(s)/d(t)=0$ a plurality of terminals 100 should be presented to the individual contributor$_i$, or group of contributors to maximize the impulse giving potential of the prospective contributors (and contribution potential) of the group. This is the point where the maximum impulse level to make a contribution transaction exists.

In a variant, if it is not logistically possible to present the plurality of terminals 100 to the group of prospective contributors or a single terminal 100 to the individual contributor or group where $d(s)/d(t)=0$, then terminals 100 are presented at a time as close as possible to where $d(s)/d(t)=0$ indicated by a range in order to maximize the impulse giving potential of the group and/or the individual and the amount and number of contributions and gifts obtainable from a group of contributors at an event or from an individual. The present invention teaches the maintaince of the stimulus evoking an impulse to make a contribution at an effective level over a period of time during the presentation of the terminals 100. By way of example, the stimulus is initially presented and repeated until to conclusion of the presentation of the terminals 100 to group.

Access in time and space is provided by the terminal 100 to capture the impulse evoked by the stimulus to make a contribution, notwithstanding the amount of cash a contributor has on hand or whether or not a contributor has a check book on hand.

The lack of interposing a request for authorization, and/or the lack of interposing a signature verification of authorization, between the making of sequential contribution transactions made by respective contributors allows for the presentation of terminals 100 to all members of a group at a delta t, e.g. range, that is close to where $d(s)/d(t)=0$ at $t_{max}$ or at delta $t_{max\ plateau}$ as for the entire group of contributors as well as each individual contributor.

The provision of a plurality of portable, hand held terminals 100 to the group of contributors also allows for all members of a group to be presented terminals 100 at a delta t that is close to where $d(s)/d(t)=0$ or at delta $t_{max\ plateau}$ as for the entire group of contributors and also for each respective contributor. Access in space to where $d(s)/d(t)=0$ as for the entire group of contributors and also for each respective contributor is provided by the fact that terminal 100 has its own power source and is passable from one contributor to another. Interposition of a time period of waiting in line to make a contribution transaction, or wait for an authorization, removes "down stream" contribution transactions further from $t_{max}$ and/or delta $t_{max\ plateau}$ and moves the impulse giving function away from its maximum condition where $d(s)/d(t)=0$. The present invention teaches that this is undesirable.

That is, terminal 100 facilities impulse giving. Terminal 100 allows a plurality of contribution transactions to be recorded, for post-processing, at the time, $t_{max}$ or delta $t_{max\ plateau}$, the psychological stimulus, $s_{max}$, e.g. a rousing speech by a political candidate, government official, minister, fund-raiser, etc, evokes the highest impulse to make a contribution. The variable $G_i$ is a function of the incentive a contributor$_i$ has in making a contribution within the context of the contributor's physical location in the vicinity of sub-group 4001–4004, or group. The use of terminals 100 in a group setting, where a contributor$_i$ is in the vicinity of other prospective contributors, or actual contributors entering contribution transactions, stimulates the making of contribution transactions by contributor$_i$ and other contributors in the group and the associated respective sub-groups by evoking a impulse to make a contribution. The stimulus provided through the use of terminals 100 includes both positive and negative stimuli.

By way of example, contributor$_i$ may only have $20 in cash in his pocket, and a credit card. The stimulus provided to contributor$_i$ evokes an impulse to make a contribution of $100. Terminal 100 allows for the impulse to make the contribution of $100 by the contributor to be harnassed in time and space prior to the dissipation of said impulse.

With respect to positive stimulus, in one scenario, assume contributor$_1$ through contributor$_6$ in sub-group 4001 enter their respective card contribution transactions on terminal 100 as terminal 100 is circulated amoungst them. Contributor$_7$ does not want to feel left out of the group or feel like an outcast so he to follows the lead of other members of the sub-group 4001 and enters a contribution transaction on terminal 100. That is, contributor$_7$ feels an external stimulus of "peer pressure" from other members of the sub-group 4001 to conform to the actions of other members of the sub-group 4001. Moreover, since contributor$_1$ through contributor$_6$ around contributor$_7$ are making contributions and gifts via terminal 100 then the contributor is more psychologically inclined and therefore more likely to make a contribution transaction. Contributor$_7$ is also compelled to enter a contribution transaction on terminal 100 because of a psychological guilt factor the contributor feels if others in the group are making contributions and gifts and he or she does not contribute. Hence, the use and circulation of terminal 100 or terminals 100 in a sub-group or group context facilities the entering of contributions and gifts by harnessing external and/or internal psychological pain/pleasure factors at a point in time and space where such factors are of maximum benefit in the solicitation of contribution transactions, thus inducing contributors to make contribution transactions more readily in the sub-group 4001.

That is, as the terminal 100 is being circulated a contributor feels "peer-pressure" to make a contribution. Providing a group of contributors terminals 100 will increase $G_i$ for a group of contributors because an impulse for an individual contributor to make a contribution will be evoked at the location of the terminal and stimulus in time and space to the other contributors to make a contribution through interaction with other contributors in the group, and the psychological effect the contributors' actions will have on each other.

The present invention further teaches that the making of contribution transactions by a first sub-group 4001 of contributors, will induce the making of contributions and gifts by subsequent sub-groups 4002–4004. The sub-groups of contributors engage in contribution sessions in the vicinity in time and space on an initiating sub-group.

The variable $C_i$ is a function of and proportional to the ability to retire the monetary contribution commitment over time. If contributors within group have the ability to retire a monetary contribution commitment over a period of time, then $C_i$ will increase in value and the contribution potential of group will increase. The provision of terminal 100 facilitates the ability to retire a monetary contribution commitment over time and increases $C_i$.

By way of example, where a contributors has $20.00 in cash at the point where a contribution is solicited, the contributor only donates $20.00 in cash. Assuming that the contributor's contribution preference is to contribute $50.00 if he could retire the monetary contribution commitment over a period of time, provision of terminal 100 at this point in time and space allows the contributor$_n$ to make his preferred contribution amount of $50.00 at the point where the contribution is solicited, and allows the contributor to retire the monetary contribution commitment over a period of time. Therefore, providing terminal 100 to this contributor will increase $C_i$ and $C(p)$. The individual contributor will receive the benefit of being able to retire the monetary contribution commitment over time while the donation kettle electronic contributions management organization will be able to receive a "lump-sum" of contributions and gifts entered on terminal 100 by contributors in group.

$N_i$ is a variable that is correlated to a psychological factor associated with the use of a bank card to make a contribution, and the perception by a contributor that a contribution transaction made by way of credit card does not involve the use of cash in hand or "real money." The use of bank cards for contribution transactions involves variable $N_i$. Provision of the terminal 100 or a group of terminals 100 to group induces contributors to make larger contributions and gifts than would otherwise be made by way of cash or check. Hence, $N_i$ increases in value. $N_i > 1$ when terminal 100 or terminals 100 are provided. That is, the use of terminal 100 increases the $C(p)$ for the group.

The variable $X_i$ is the ability of a speaker or solicitor of a contribution to incite the group to action. The speaker is the stimulus evoking an impulse to make a contribution by contributors in group. The more charismatic the speaker or solicitor of contributions and gifts, or sound recording or audio visual presentation, the more likely a respective contributor$_n$, or group, will be to make a larger respective individual contribution or cumulative contributions and gifts. By way of example, a candidate for political office provides a stimulus evoking an impulse in his supporters to consummate contribution transactions in the field on terminal 100 by a rousing speech. By way of example, a clergy member provides a stimulus by evoking a plurality of impulses in group at a service or fund-raiser to make a larger cumulative contribution on terminal 100. By way of contrast, with the envelope donation system the amount of contribution is generally fixed prior to the service. Consequently, impulse giving by contributors in group is not induced of facilitated and Xi is not increased. The provision of terminal 100 or a plurality of terminals 100 harnesses the spontaneous impulse giving potential that is created by the incitement to action created by an external stimulus, e.g. a speech, a moving motion picture, and other auditory or visual stimulus designed to evoke a psychological response, e.g. sympathy, anger, compassion, thanksgiving, contrition, etc., conducive to the making of a monetary contribution commitment.

An incitement to action can also be provided by an external stimulus provided by a religious object. A religious object includes an icon, a statue of a religious figure, a painting, a relic, or a passage from a holy book. It is understood that the presentation of terminal 100 to a contributor should be made to a contributor when the contributor is most inclined to make a contribution. That is, terminal 100 is presented or provided in the vicinity of a religious object. Contributors are inclined to make contributions and gifts of thanksgiving or atonement when in the presence of a motivator, e.g. a religious object, and/or while praying or worshiping. Hence, in the scenario where an individual contributor encounters terminal 100 during a prayer session or near a religious object, an individual contributor is inclined to make a contribution, and to make a larger amount of each respective individual contribution. A religious object is a stimulus that evokes an impulse to make a contribution.

By way of example, terminal 100 is an element in an offering system for the making of contributions and gifts at locations for prayer and worship, and at a religious site or a shrine where a religious object 1000 (not shown) provides a negative or positive stimulus evoking an impulse in a contributor or group of contributors to make a contribution or contributions and gifts. The system comprises, in combination, a religious object 1000 and an electronic contributions and gifts management terminal 100. A religious object 1000 provides a psychological stimulus evoking an impulse for the making of monetary contribution commitments. An electronic contributions and gifts management terminal 100 is positioned at a location in said site in the vicinity of the psychological stimulus (religious object 1000) for facilitating the satiation of an impulse to make a monetary contribution commitment by use of information bearing card. The terminal 100 has means for immediately recording and storing a contribution transaction at the point of maximum stimulus for evoking an impulse to make a contribution, e.g. where the contributor or group of contributors are nearest to the psychological external stimulus, e.g. religious object, icon, religious painting, relic, etc. The information of the monetary amounts of the successive contributions and gifts designated and entered therein are correlated to the individual cardholders whose cards were read by a card reader on terminal 100. In this way the impulse to contribute evoked by the psychological stimulus or benefit (whether positive or negative) is satiated, gratified to the fullest, and satisfied.

To increase the impulse level terminal 100 has a display for displaying message prompts to prospective contributors soliciting the making of monetary contribution commitments. Examples of such message prompts are disclosed herein.

In a variant, the contribution system has a terminal 100 with its own battery powered electrical energy source (terminal 100 is portable in this variant). Further, terminal 100 automatically records information entered of the numerical amounts of individual designated monetary contributions and gifts correlated to the indicia read on information bearing cards 145, 150 corresponding to a respective contributor for identification of the contributor without interposing a request for authorization between sequential contribution transactions. The information is recorded for eventual off-loading from terminal 100.

In a further variant, the religious object 1000 inducing a psychological stimulus for evoking an impulse to make a monetary contribution commitment is selected from the group consisting of an icon, a prop, a statue, a painting, a passage from a holy book, or combination thereof.

A method of simplifying and inducing the giving of monetary contribution commitments by individuals, receiving and immediately recording thereof upon receipt is provided with offering system for the making of contributions and gifts at locations for prayer and worship, and at a religious site or a shrine where a religious object 1000 provides a negative or positive stimulus evoking an impulse to make a contribution. The method comprises providing individuals for immediately making of monetary contributions and gifts with terminal 100 for making of record data of an contribution commitment in the vicinity of a religious object 1000. Religious object 1000 provides a psychological stimulus for evoking an impulse to make monetary contribution commitments. The terminal 100 has a source of electric power and a plurality of entry keys manually operable for entering the amount of the monetary contribution to be given, and a reader 307 on the terminal 100 for reading a record medium, e.g. an information bearing card, having indicia thereon identifying an individual contributor making a given monetary contribution. In a variant, the terminal 100 has means for making a visual display of the amount entered by manual operation of entry keys, and has means for recording the amount of the contribution including means for storing the amount correlated to the indicia read on the record medium of the corresponding contributor. The correlated amount and indicia read by said reader are for eventual off-loading thereof. In yet another variant, the method further comprises the step of directly displaying message prompts, e.g. as those disclosed herein, to prospective contributors soliciting the making of monetary contribution commitments, and comprises the steps of refraining from interposing a request for authorization between sequential contribution transactions made at off-line terminal 100, off-loading said contribution transactions from terminal 100 to card account processor 1031 in order to obtain authorizations for said contribution transactions, and processing said transactions by entering debits and credits to respective accounts for authorized contribution transactions.

In yet another variant, the method further comprises the step of forwarding records of said authorized contribution transactions to the contributors to substantiate said contribution transactions. In yet another variant, the method further comprises the steps of refraining from interposing a request for authorization between sequential contribution transactions made at off-line terminal 100, off-loading said contribution transactions from terminal 100 to a clergy member's terminal 120 via communication link 140 from terminal 100, down-loading the contribution transactions from the clergy member's terminal 120 to card account processor 1031 in order to obtain authorizations for said contribution transactions, and processing transactions by entering debits and credits to respective accounts for authorized contribution transactions.

The impulse giving potential is not limited by the amount of cash a contributor has on hand, or whether or not the contributor has a check book on hand utilizing the methods disclosed herein. Moreover, the provision of terminal 100 in the vicinity of an externally stimulated contributor or by directly handing the terminal 100 to the contributor at the point where he or she is maximally stimulated to make a contribution results in a sudden inclination to enter a contribution, without conscious thought in one variant. It will be understood that terminal 100 is presented or provided to a contributor or group of contributors during a time interval where there arousal from the external stimulus is at its maximum, and where the contributor's or contributors' collective state of mind is most receptive to consummating contribution transactions and/or making a larger contribution transaction than would otherwise be made if the impulse to contribute were allowed to dissipate or decay over time. These factors increase Xi and increase the C(p) of group.

A method of maximizing the contribution potential a single or a plurality of events with a fixed number of terminals 100 is also provided herein. The method includes the steps of analyzing the statistical trends associated with a group of contributors or gift givers, sites and the like described herein, and then deploying terminals 100, such that contributions or gifts are manximized. The present invention also provides a method of allocating a plurality of donation kettle electronic contributions management terminals 100 to maximize the contribution potential of a group of competing events, and to maximize the contribution potential of an individual event.

Assume a donation kettle electronic contributions management organization has a plurality of simultaneous competing donation kettle electronic contributions management events: donation kettle electronic contributions management event$_A$, donation kettle electronic contributions management event$_B$, and donation kettle electronic contributions management event$_C$. Assume a donation kettle electronic contributions management organization has a set of 100 donation kettle electronic contributions management terminals 100, terminal$_1$, . . . terminal$_{100}$. In order to maximize C(p) over the group of all contributors at the competing events, e.g. donation kettle electronic contributions management event$_A$, donation kettle electronic contributions management event$_B$, and donation kettle electronic contributions management event$_C$, a donation kettle electronic contributions management organization allocates terminals from fixed set using a hierarchical method in which larger sub-sets of terminals 100 in set are allocated to events which have larger contribution potentials. The contribution potentials of events are calculated first by an assessment of the individual prospective contributors attending each respective event and assigning them an individual contribution potential and then summing up the contribution potentials of the individuals to get a total contribution potential for the group.

It will be understood that either all of variables: $M_i$, $P_i$, $G_i$, $C_i$, $N_i$, $X_i$, $A_i$, or a combination thereof, are assessed and used in the calculation of contribution potential for a group, an event, or a respective contributor. Assume two competing contribution events. By way of example, where the group of contributors that will attend donation kettle electronic contributions management event$_A$ are on the average more affluent or historically tend to make larger contributions and gifts than the group of contributors that will attend donation kettle electronic contributions management event$_B$ (with all other variables held constant), the C(p) of event is larger than the C(p) of event B. The donation kettle electronic contributions management organization allocates a larger sub-set of donation kettle electronic contributions management terminals from set to donation kettle electronic contributions management event$_A$ (the event with the larger contribution potential) than to event (the event with the lower contribution potential).

In the scenario, where there are three or more competing contribution events, e.g. events, sub-sets of terminals 100 from set are allocated proportionally to the contribution potentials of each respective donation kettle electronic contributions management event. By way of example, assume donation kettle electronic contributions management event$_A$ has a contribution potential rating of 10, donation kettle electronic contributions management event$_B$ has a contribution potential rating of 5, and donation kettle electronic contributions management event$_C$ has a contribution potential rating of 1. The donation kettle electronic contributions management organization proportionally allocates the largest number of terminals to donation kettle electronic contributions management event$_A$; the second largest number of terminals are allocated to donation kettle electronic contributions management events and the smallest number of terminals are allocated to donation kettle electronic contributions management event$_C$. This method allows the maximization of the contribution potential over the total number of competing events. Hence, this method of allocation maximizes the contribution potential from fixed set of terminals 100.

It is understood that the methods disclosed herein can also be used to provide terminals 100 to contributors who have historically contributed to a donation kettle electronic contributions management organization prior to providing the terminals to other contributors, and can also be used in combination with other factors that affect the contribution potential of a group or an individual described herein.

Hence we see that providing the features and benefits of terminal 100 will increase C(p) over a group of contributors and increase the amount of contributions and gifts collected.

The terminal 100 gathers and provides information of who current contributors are. It is desirable to obtain demographic information about current contributors. By way of example, information concerning the sex of contributors provides useful data that allows a donation kettle electronic contributions management organization to tailor its efforts to maximize the contribution process. Terminal 100 allows a donation kettle electronic contributions management organization to obtain information comprising whether the current contributors are young or old, educated or non-educated, if they have conservative or liberal voting tendencies, whether they attend a baseball game or the opera, do they see themselves as extroverts or introverts. This information allows the fund-raiser to know who the present contributors are and allows the fund-raiser to cultivate, solicit and thank current contributors thereby generating contributor loyalty and future contributions and gifts.

Information whether current contributors are male or female is obtained by reading information bearing card 100. The first name of a respective contributor, or whether a contributor has Mr., Ms., or Mrs. is read from the indicia encoded on the card. If the "first name" e.g. Steven, of a contributor is read a software routine is run to determine if the first name is a name usually given to a male or to a female. This method allows a donation kettle electronic contributions management organization or person to determine percentages of male and female contributors.

In a variant, the contributor information entered from a respective contributor's information bearing card is entered into terminal 100 by the methods described above. This card information is electronically associated with information that comprises an address of the contributor from a database, such as a local electronic telephone directory, a national electronic telephone directory, e.g. MCI's national telephone directory service. The contributor information is entered onto a mailing list.

In a variant, the card information entered into terminals 100 is used in a method to determine changes in demographic trends of the donation kettle electronic contributions management organization's future prospective contributors as compared to the donation kettle electronic contributions management organizations present group of contributors. Assume that groups and groups are a donation kettle electronic contributions management organizations current groups of prospective contributors. Assume that groups and groups are a donation kettle electronic contributions management organization's future groups of contributors. Changes in patterns of contributions and gifts made by groups are tabulated. This changes are used to predict the composition of groups to determine if the future groups, will have the same characteristics as the current groups, or if the groups' characteristics will be different.

Terminal 100 provides message prompts on display 840 that stimulate and motivate contributors evoking an impulseto make contributions and gifts by expressing the message that if a contribution is made, the contributor has "molded the future." For example, display 840 begins a contribution session with the message "You can teach twelve illiterate people to read with a contribution of $20.00" and concludes a respective contribution session by displaying a message, "Your contribution has just provided three meals a day for ten orphans." Prompts of this type stimulate and motivate the impulse for the making of initial and subsequent contribution transactions by providing contributors a positive psychological boost, e.g the message makes the contributors "feel good" upon making the contribution transaction.

Terminal 100, terminal 120, a card account processor 1031, or combination thereof, provide for the identification and categorization of contributors within a group. By way of example, the system allows for and greatly facilitates the organization of the largest contributor transaction down to the smallest contributor transaction at a contributions and gifts session. For example, assume contributor 1 contributes $50, contributor 2 contributes $100, and contributor 3 contributes $150 on terminal 100. A report is printed indicating that contributor 3 was the major donor at the contribution session, contributor 2 was the second largest donor at the session, and contributor 1 was the third largest donor at the contribution session. Similarly, contribution information for a plurality of contribution sessions is tabulated indicating the rankings of respective contributors. It will be understood that the compilation of this information provides for rapid identification of contributors who then can be subsequently solicited for contributions and gifts.

For example, a contributor who makes a small contribution on an annual basis, e.g. $50, for fifty or sixty years, will give $2500 over a fifty year period, and $3000 over a sixty year period. Therefore, terminal 100, terminal 120, a card account processor, or combination thereof, provides a system and method for facilitating the tracking the cumulative contributions and gifts of respective contributors. Reports are then printed and forwarded to individual contributors who make sequential contributions and gifts to the donation kettle electronic contributions management organization sharing the organizations appreciation with loyal contributors and assisting in obtaining for continuing support.

These reports motivate and stimulate an impulse in a committed annual contributor to continue to make contributions and gifts every year, or at some other appropriate interval, bringing the total of the respective contributors contributions and gifts well into hundreds, even thousands of dollars. Terminal 100 provides an input for entering contributor information and contribution information that allows for the tracking of contributors.

Terminal 100 utilizes message prompts displayed on display 840 to communicate wish list item prompts 4094, 4096, 4100, and 4102. Wish list item prompts are stimulus that evoke an impulse to make a contribution. Wish list item prompts generally present needs for items the donation kettle electronic contributions management organization has for specific projects. For example, wish list items for a political candidate includes a phone system for a campaign, the printing of 5000 copies of a newsletter to be sent to voters, etc.

By way of further example, display 840 prompts a contributor stimulating him or her and creating an impulse make a contribution to obtain second wish list item for the donation kettle electronic contributions management organization: "$5.00—Needy Child Services—provides a needy child meals for one week." Prompt is be displayed concurrently with other prompts, e.g. wish list item prompt, in one variant. In another variant, prompt is displayed for a time out period on display 840.

A second terminal 100 has second wish list item prompt displayed to a contributor soliciting a contribution for a second wish list item: "$5.00—Needy Child Services—provides a needy child meals for one week." A third wish list item prompt is displayed to a contributor soliciting a contribution for a third wish list item: "$25.00—Hurricane Disaster Relief Services—buys 200 blankets for the victims of Hurricane Josie." A fourth prompt is displayed to a contributor soliciting a contribution for a fourth fund-raising organization wish list item: "$50.00—Newborn Services—buys 100 bottles of baby formula for newborns in South America." A fifth prompt is displayed to a contributor soliciting a contribution for a fifth donation kettle electronic contributions management organization wish list item: "$1000.00—Incubators for Prematurely Born Infants in India—buys 1 incubator that will save the lives of many infants in a Children's hospital." It will be understood that the menu of wish list item prompts will induce contributors to make contributions and gifts that are used to obtain specific wish list items. As each wish list item is correlated with a contribution, the respective wish list item may be removed from the group of wish list items displayed on display 840 on terminal 100 in one variant. Alternately, the group of wish list items may continue to be displayed and the amount of wish list items which are correlated with contributions and gifts may be tallied.

Moreover, terminal 100 may route all contributions and gifts to a single account, and may keep a running total of the number of specific "wish list" items for which contributions and gifts have been made so that later the wish list items may be purchased according to the respective number of wish list items for which contributions and gifts have been given. By way of example, assume three contributors give contributions and gifts selecting wish list item three above, two contributors give contributions and gifts selecting wish list item four, and one contributor gives a contribution selecting wish list item five. Terminal 100 stores information about the six total contribution transactions. (3×$25)+(2×$50)+(1× $1000)=$1175 in contributions and gifts would be stored in terminal 100 for eventual off-loading thereof. This amount is off-loaded to a single account of the donation kettle electronic contributions management organization while a tally of each respective type of wish list item is recorded, e.g. (3×200 blankets)+(2×100 baby bottles)+(1×1 incubator), so that each item can be purchased in the quantity desired according to the request of the respective contributors.

In another variant a plurality of terminals 100 communicate wish list item contribution information among other terminals 100, terminal 120, a display with a transmitter and/or reciever for communicating with terminal 100, terminal 120, or a combination thereof(not pictured) e.g. a large screen display, or a combination thereof showing the progress being made in with respect to contributions and gifts for respective with list items.

It will be further understood that terminal 100 by displaying the wish list item prompts on display 840 markets the specific philanthropic work a donation kettle electronic contributions management organization, and does so without the need for a human solicitor of the contribution in one variant. Moreover, the visual and audio presentation on teh display of a larger screen television is a stimulus evoking an inpulse to make a contribution.

Terminal 100 by displaying the various prompts on display 840 induces a contributor to upgrade his contribution amount by demonstrating to him or her and allowing him or her to compare the difference a slightly larger contribution amount made to a first wish list item makes as opposed to a smaller contribution amount to a second wish list item. By way of example, modest contribution amounts are upgraded when a message prompt on terminal suggests that "$40.00 purchases meals for a hungry family in South America for a week" as compared to a competing message prompt suggesting that "$35.00 purchases art supplies for a group of three children."

The present invention contemplates that display 840 displays stories, quotes, photographs, multi-media presentations, and other examples to present respective "wish list" items visually. The present invention also contemplates that terminal 100 has means to display wish list items audibly.

In a variant, terminal 100 stores information regarding the most promising contribution prospects and displays this information to a human solicitor of contributions and gifts. For example, data regarding historical contribution amounts and frequencies is gathered and downloaded to terminal 100, e.g. "Mr. A" contributed $1000 during the last contribution session, and "Mrs. B" contributed $15,000 during the last contribution session. This information is displayed to a human solicitor of contributions and gifts on terminal 100 in order to order the sequence of contribution solicitation and schedule the amount of time that should be spent with each prospect, e.g. a solicitor may spend more time with Mrs. B since she has historically contributed larger contribution amounts to the cause.

A method of making a total or cumulative contribution gift over time is also provided in one variant. By way of example, message prompt on display 840 displays a message prompt requesting the contributor to make a cumulative contribution over time. For example, prompt on display 840 reads "Please consider making a monthly contribution of $25.00 over one year for a total contribution commitment of $300.00." The contributor is requested to confirm the contribution commitment amount. If yes, terminal 100 stores the cumulative contribution commitment, e.g. $300, off-loads the contribution cumulative contribution commitment to, e.g. fund-raisers terminal 120 for storage. As each monthly interval comes up donation kettle electronic contributions management terminal 100 transmits the contributor's monthly contribution amount of $25.00 for processing to a card account processor 1031 until the commitment period ends, e.g. until the total contribution of $300 is made. It is understood that the contributor's total amount of his commitment is important and substantial, and giving on a periodic basis allows the contributor to budget to accomplish this goal and makes the giving of a larger contribution more appealing since the contribution can be made over time versus in one lump sum.

A portable, hand-held contribution collection peripheral or terminal 100 is passable manually from one contributor to another contributor as discussed above in one variant. The terminal has its own battery electrical energy source 947 and a card reader 307 for reading indicia on an information bearing card identifying a respective contributor making a contribution using a respective card record medium for identification of the contributor. Terminal 100 may have a display, but not a keyboard in this variant. Optionally, terminal 100 does not have a display or a keyboard. It will be understood that decreasing the contribution to one step will significantly decrease the amount of time to consummate a contribution transaction in the filed and also the amount of time necessary to consummate a plurality of contribution transactions in the field.

Terminal 100 correlates a pre-programmed contribution amount of an order inducing the making of a contribution with the respective contributor's card information read by the electronic card reader 307.

By way of example, contributor 1 enters his respective card information on terminal 100. Terminal 100 stores contributor 1's respective card information correlated to a pre-programmed contribution amount of $50.00. Contributor 1 does not perform the step of entering a contribution amount since his card information is correlated to a pre-programmed contribution amount. Terminal 100 is passed sequentially to contributor 2. Terminal 100 is passed or given to contributor 2.

Contributor 2 enters his respective card information on terminal 100. Terminal 100 stores contributor 2's respective card information correlated to a pre-programmed contribution amount of $50.00. Contributor 2 does not perform the step of entering a contribution amount since his card information is correlated to a pre-programmed contribution amount. Terminal 100 is passed sequentially to contributor 3. Terminal 100 is passed or given to contributor 2. The process is repeated by contributors sequentially until the last contributor, contributor N, enters his respective card information on terminal 100. Terminal 100 stores contributor N's respective card information correlated to a pre-programmed contribution amount of $50.00. Contributor N does not perform the step of entering a contribution amount since his card information is correlated to a pre-programmed contribution amount.

Data storage in terminal 100 stores the following:

| | |
|---|---|
| Contributor 1's card information | $50.00 |
| Contributor 2's card informafion through | $50.00 |
| Contributor N's card information | $50.00 |

Subsequently, terminal or peripheral 100 transmits:
Contributor 1's card information and associated $50.00
Contributor 2's card information and associated $50.00
. . . through

| | |
|---|---|
| Contributor N's card information | and associated $50.00 | to donation kettle electronic contributions management terminal 120 via docking station 1999. That is a communication link is established between terminal 100 and terminal 120 for the transmission of the information above. Terminal 120 stores the information:

Contributor 1's card information and associated $50.00

Contributor 2's card information and associated $50.00

. . . through

Contributor N's card information and associated $50.00

Terminal 120 then transmits the information, including optional information identifying a donation kettle electronic contributions management organization, an account of a fund raising organization, or combination thereof, via a communication link 1030, by way of example a telephone line, to card account processor 1031 or a funds processing network.

It is understood that the correlation of a pre-programmed contribution amount can optionally occur at fund-raisers's terminal 120, a card account processor 1031, or some other site remote from terminal 100. In this variant terminal 100 automatically stores information recorded of the indicia read from each respective cardholder contributors card record medium, e.g. credit card or debit card, on terminal 100 for eventual off-loading thereof.

For example, data storage in terminal 100 stores the following in an off-line mode:

Contributor 1's card information;

Contributor 2's card information;

. . . through

Contributor N's card information.

Subsequently, terminal or peripheral 100 transmits: Contributor 1's card information;

Contributor 2's card information;

. . . through

Contributor N's card information to donation kettle electronic contributions management terminal 120 via docking station 1999. Donation kettle electronic contributions management terminal 120 stores and correlates each respective contributor's card information with a pre-programmed or pre-set contribution amount:

Contributor 1's card information and associated $50.00

Contributor 2's card information and associated $50.00

. . . through

| Contributor N's card information | and associated $50.00 |
|---|---|

A communication link is established between terminal 120 for the transmission of the information above to a card account processor. Terminal 120 then transmits the correlated information, including optional information identifying a donation kettle electronic contributions management organization, an account of a fund raising organization, or combination thereof, via communication link 1030, by way of example a telephone line, to card account processor 1031 or a funds processing network.

The terminal 100 as described above is utilized in a method of simplifying and inducing the giving of monetary contributions and gifts by individuals, receiving and immediately recording thereof upon receipt. The method comprises the steps of providing individuals for making of monetary contributions and gifts with a portable, hand-held terminal 100 for making of record information of a respective contributor's card information. Terminal 100 has its own source of electric power. Terminal 100 has a case dimensioned for being held in the palm of an individual's hand, a reader 307 on terminal for reading a cardholder contributor's respective record medium having indicia thereon identifying an individual contributor making a given monetary contribution. The terminal 100 has a means for verifying that the respective contributor's card information was correctly entered and read by the card reader 307 on terminal 100. For example, a light flashes after the contributor enters his card information on terminal 100 and terminal correctly reads and stores the card information. By way of yet another example, terminal 100 audibly indicates that a respective contributor has correctly entered his respective card information on terminal 100, e.g. the terminal projects an audible "Thank you" message via a speaker on the terminal and electronic circuitry.

It is further understood that terminal 100 has a shell that is dimensioned to be comfortably held in the palm of a contributor's hand. The shell has optional indicia indicating the donation kettle electronic contributions management organization to which the contribution is being made and optional indicia thereon indicating the order of the contribution amount made thereon by entering a respective cardholder's card information thereon.

Terminal 100 optionally functions in two modes of operation. One mode of operation includes the use of a display and keyboard as described above. A second mode operates in a mode where the keyboard and/or display of the terminal 100 is overlayed with a removable cover (not shown). That is, a case is provided overlaying the embodiment of terminal 100 having a keyboard and a display. The cover overlays terminal 100 in a manner so as to only reveal card reader 307. The cover is removably connected to terminal 100 so that terminal 100 can function in the mode where a preprogramed contribution amount is correlated to respective card information.

It is understood that terminal 100 is activated to work in a mode in which a pre-programed contribution amount is correlated to a respective cardholding contributor's card information automatically once card information is entered onto terminal 100. When cover is removed from terminal 100 the terminal can then be activated to work so that contribution amounts are entered via keyboard as described above. The cover is made of vinyl, plastic, or other appropriate material. In a variant, cover is made to removably snap onto terminal's 100 shell. The ability to have a cardholder contributor simply enter his card information and not have to manually enter a contribution amount on terminal 100 greatly decreases the time required to consummate a contribution transaction in the field for a single contributor and also for a multiplicity of sequential contributors.

It is also appreciated that docking station 1999 may be disposed in the interior of the kettle and provide apertures through which the keys and display of terminal 100 are visible. In this variant terminal 100 is disposed in the interior cavity of kettle 100. In one varinat terminal 100 can only be removed by first accessing the interior of the kettle.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A computer implemented method of capturing monetary donations or monetary gifts made by donors or gift givers, comprising:

inputting sequences of data comprised of monetary donations or monetary gifts, said monetary donations or monetary gifts made by a plurality of said respective donors or gift givers at a multiplicity of geographically distinct sites where said donations and gifts are being received; temporarily capturing said sequences at said multiplicity of geographically distinct sites on a plurality of respective electronic devices physically located at said sites to obtain temporarily captured sequences; transmitting said temporarily captured sequences from said electronic devices to a processing device remote from a plurality of said distinct sites for processing; said processing comprising entering a debit representative of a respective monetary donation or monetary gift to an account of a respective donor or gift giver; and, entering a credit representative of a respective monetary donation or monetary gift to an account of a recipient of said respective monetary donation or monetary gift.

2. The method of claim 1 in which said monetary donations or monetary gifts are input unimpeded by input of additional information.

3. The method of claim 1 in which the step of inputting comprises the step of reading electronically.

4. The method of claim 1 further comprising the step of tallying said monetary donations or monetary gifts at a remote processing device.

5. The method of claim 1 further comprising the step of statistically manipulating at least a respective sequence of said data.

6. The method of claim 1 further comprising the step of statistically manipulating a plurality of said sequences of data to obtain statistically manipulated data.

7. The method of claim 1 further comprising the steps of statistically manipulating a plurality of said sequences of data to obtain statistically manipulated data and generating a record comprising said statistically manipulated data.

8. The method of claim 1 further comprising the steps of statistically manipulating a plurality of said sequences of data to obtain statistically manipulated data, and generating a record comprising said statistically manipulated data, and in which said statistically manipulated data is selected from the group consisting of total donations or gifts received; a histogram; a donation or gift average per donor or gift giver; an arithemetic mean, said arithmetic mean selected from the group consisting of a mean of number of donors, number of gift givers, quantity of donations, quantity of gifts, size of donations, and size of gifts; a mode, said mode selected from the group consisting of a mode of number of donors, number of gift givers, quantity of donations, quantity of gifts, size of donations, and size of gifts; a median, said median selected from the group consisting of a median of number of donors, number of gift givers, quantity of donations, quantity of gifts, size of donations, and size of gifts; a weighted mean, said weighted mean selected from the group consisting of a weighted mean of number of donors, number of gift givers, quantity of donations, quantity of gifts, size of donations, and size of gifts; a harmonic mean, said harmonic mean selected from the group consisting of a harmonic mean of number of donors, number of gift givers, quantity of donations, quantity of gifts, size of donations, and size of gifts; a geometric mean, said geometric mean selected from the group consisting of a geometric mean of number of donors, number of gift givers, quantity of donations, quantity of gifts, size of donations, and size of gifts; a logarithmic mean, said logarithmic mean selected from the group consisting of a logarithmic mean of number of donors, number of gift givers, quantity of donations, quantity of gifts, size of donations, and size of gifts; a root mean square, said root mean square selected from the group consisting of a root mean square of number of donors, number of gift givers, quantity of donations, quantity of gifts, size of donations, size of gifts, and combination thereof; a root sum square, said root sum square selected from the group consisting of a root sum square of number of donors, number of gift givers, quantity of donations, quantity of gifts, size of donations, size of gifts, and combination thereof; a normal distribution curve, said normal distribution curve selected from the group consisting of a normal distribution curve of number of donors, number of gift givers, quantity of donations, quantity of gifts, size of donations, size of gifts, and combination thereof; a spread, said spread selected from the group consisting of a spread of number of donors, number of gift givers, quantity of donations, quantity of gifts, size of donations, size of gifts, and combination thereof; a variance, said variance selected from the group consisting of a variance of number of donors, number of gift givers, quantity of donations, quantity of gifts, size of donations, size of gifts, and combination thereof; a standard deviation, said standard deviation selected from the group consisting of a standard deviation of number of donors, number of gift givers, quantity of donations, quantity of gifts, size of donations, size of gifts, and combination thereof; a skewed distribution, said skewed distribution selected from the group consisting of a skewed distribution of number of donors, number of gift givers, quantity of donations, quantity of gifts, size of donations, size of gifts, and combination thereof; a sampling, said sampling selected from the group consisting of a sampling of number of donors, number of gift givers, quantity of donations, quantity of gifts, size of donations, size of gifts, and combination thereof; a condifence level, said confidence level selected from the group consisting of a confidence level associated with a number of donors, number of gift givers, quantity of donations, quantity of gifts, size of donations, size of gifts, and combination thereof; a regression analysis, said regression analysis selected from the group consisting of a regression analysis associated with a number of donors, number of gift givers, quantity of donations, quantity of gifts, size of donations, size of gifts, and combination thereof; and, a donation or gift average of a sub-group of donors or gift givers.

9. The method according to claim 7 further comprising the step of ascertaining the donation or gift giving habits of an entity from said statistically manipulated data.

10. The method according to claim 1 further comprising the step of retrieving petition data or intention data from said electronic devices.

11. The method according to claim 1 further comprising retrieving petition data or intention data from said electronic devices, and correlating said petition data or intention data with data comprised of monetary donations or monetary gifts.

12. The method according to claim 1 further comprising the step of presenting display options on a respective electronic device of increasing absolute value and of an order inducing the making of greater monetary donation or monetary gift amounts.

13. The method according to claim 1 further comprising the step of retreiving status data of said electronic devices, whereby the functioning of a respective electronic device is readily ascertained.

14. The method according to claim 1 further comprising the step of manually manipulating a touch sensitive screen to input said monetary donations, monetary gifts, or portions thereof.

15. The method according to claim 1 further comprising the step of energizing said electronic devices with a rechargeable source of energy.

16. The method according to claim 1 further comprising the step of presenting multiple display options to said donors or gift givers to induce entry of portions of said sequences.

17. The method of claim 1 in which the step of inputting comprises the step of reading electronically data from respective record bearing media of said respective donors or gift givers, said record bearing media selected from the group consisting of smart cards, magnetically striped cards, and contactless cards.

18. The method according to claim 1 further comprising the step of electronically preauthorizing portions of said sequences.

19. The method according to claim 1 further comprising the step of electronically conveying to said donors or gift givers audible messages after donations or gifts are received on said electronic devices.

20. The method according to claim 1 further comprising the step of electronically conveying to said donors or gift givers audible messages attracting said donors or gift givers to make donations or gifts on said electronic devices.

21. The method according to claim 1 further comprising the step of selecting a respective recipient from a group of prospective recipients to which respective donations or gifts are designated.

22. The method according to claim 1 further comprising the step of selecting a respective fund associated with a particular charity to which a plurality of said donations or gifts are designated.

23. The method according to claim 1 further comprising the step of generating a receipt for a donor or gift giver for a plurality of donations or gifts made by a respective donor or gift giver from a site remote from said distinct sites.

24. The method according to claim 1 in which there are a plurality of docking stations for said electronic devices, and said method further comprises the step of communicatively and removably attaching said electronic devices to said docking stations for transmission of said sequences to said processing device.

25. The method according to claim 1 in which there are a plurality of docking stations for said electronic devices, said method further comprising the step of networking said docking stations for transmission of said sequences to said processing device.

26. The method according to claim 1 in which there are a plurality of docking stations for said electronic devices, said method further comprising the step of energizing said electronic devices with a source of energy eminating from docking stations.

27. The method according to claim 1 further comprising the step of permanently mounting a plurality of said respective electronic devices in a plurality of docking stations, each respective docking station fastened to an interior or exterior portion of a building.

28. The method of claim 1 further comprising linking said electronic devices to each other so that said electronic devices can communicate electronically with each other.

\* \* \* \* \*